United States Patent
Nakamura

(10) Patent No.: US 8,333,326 B2
(45) Date of Patent: Dec. 18, 2012

(54) STACKED BARCODE READER AND STACKED BARCODE READING METHOD

(75) Inventor: Hiroshi Nakamura, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/240,208

(22) Filed: Sep. 22, 2011

(65) Prior Publication Data

US 2012/0085823 A1 Apr. 12, 2012

(30) Foreign Application Priority Data

Oct. 7, 2010 (JP) ................................. 2010-227437
Oct. 7, 2010 (JP) ................................. 2010-227438

(51) Int. Cl.
*G06K 7/10* (2006.01)
(52) U.S. Cl. ............ 235/462.16; 235/462.1; 235/462.09
(58) Field of Classification Search ............. 235/462.01, 235/462.09, 462.1, 462.16
See application file for complete search history.

(56) References Cited

U.S. PATENT DOCUMENTS

| | | | | |
|---|---|---|---|---|
| 5,489,769 | A * | 2/1996 | Kubo ........................ | 235/462.09 |
| 6,938,824 | B2 * | 9/2005 | Madej et al. ............. | 235/462.16 |
| 7,021,545 | B2 * | 4/2006 | Iwaguchi et al. ........ | 235/462.16 |
| 7,380,718 | B2 * | 6/2008 | Nakamura ................ | 235/462.01 |
| 7,562,820 | B2 * | 7/2009 | Muramatsu ................... | 235/400 |
| 8,146,816 | B2 * | 4/2012 | Kuyper-Hammond et al. ........................ | 235/462.01 |
| 2004/0026510 | A1 * | 2/2004 | Cheung et al. ............. | 235/462.1 |
| 2004/0262392 | A1 * | 12/2004 | Longacre et al. ......... | 235/462.07 |
| 2006/0102727 | A1 * | 5/2006 | Iwaguchi et al. ......... | 235/462.16 |
| 2011/0233279 | A1 * | 9/2011 | Nakamura ................ | 235/462.09 |

FOREIGN PATENT DOCUMENTS

JP 08-241369 9/1996

\* cited by examiner

*Primary Examiner* — Daniel Hess
(74) *Attorney, Agent, or Firm* — Frommer Lawrence & Haug LLP

(57) ABSTRACT

In a decoding section of a stacked barcode reader, the brightness values of multiple pixels configuring image data are used to calculate multiple line widths of the bars and the spaces of the stacked barcode. Based on the evaluation value of the frequency distribution of multiple line widths, a priority order of T-sequence is determined. According to this priority order, the T-sequence is measured and the code word corresponding to the T-sequence is obtained. With this, the priority order of the T-sequence is determined based on the evaluation value (such as the maximum value, variance, etc.) of the frequency distribution of the line widths of the bars and the spaces that configure the stacked barcode increasing reading performance of the barcode reader on a stacked barcode while reducing the number of errors in all the decoded code words, despite the level of the resolution of the image pickup optical system.

12 Claims, 14 Drawing Sheets

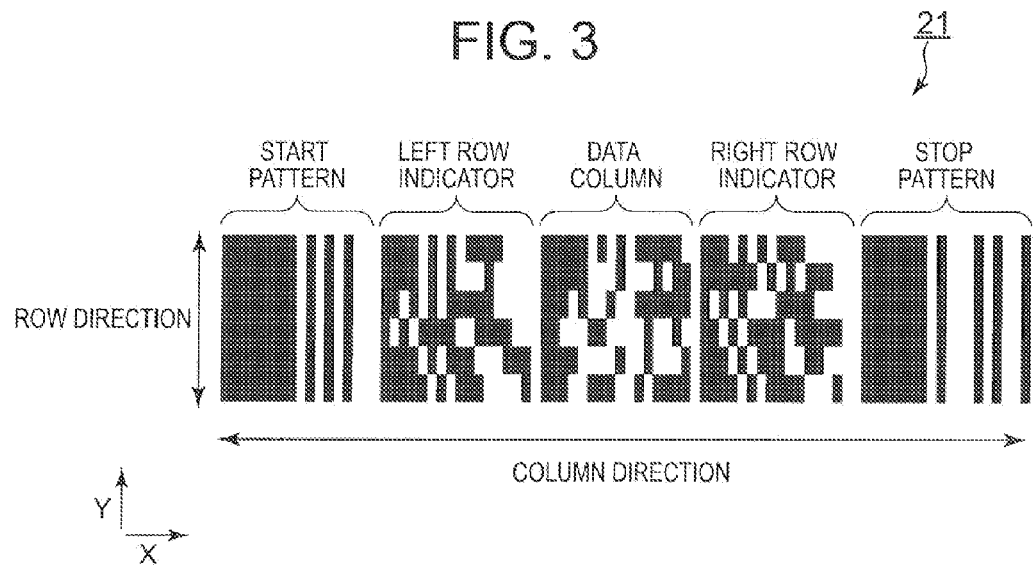
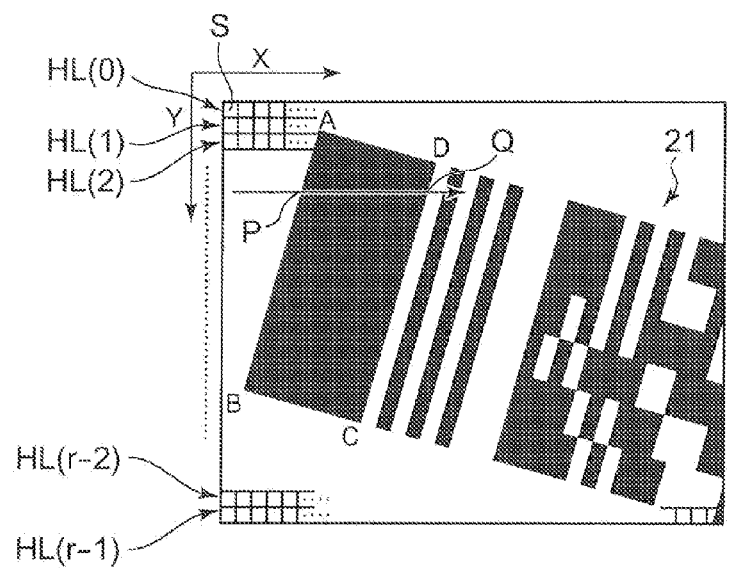

FIG. 9 (a)
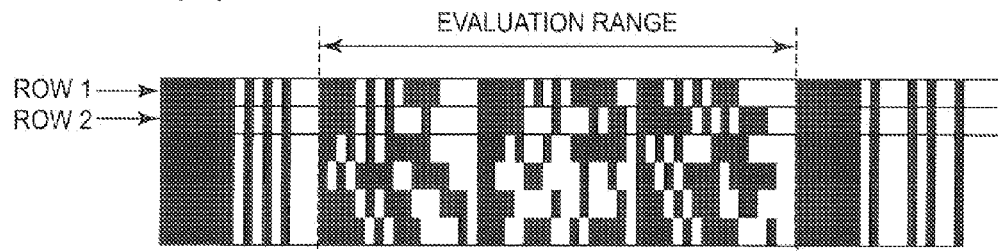
FIG. 9 (b)
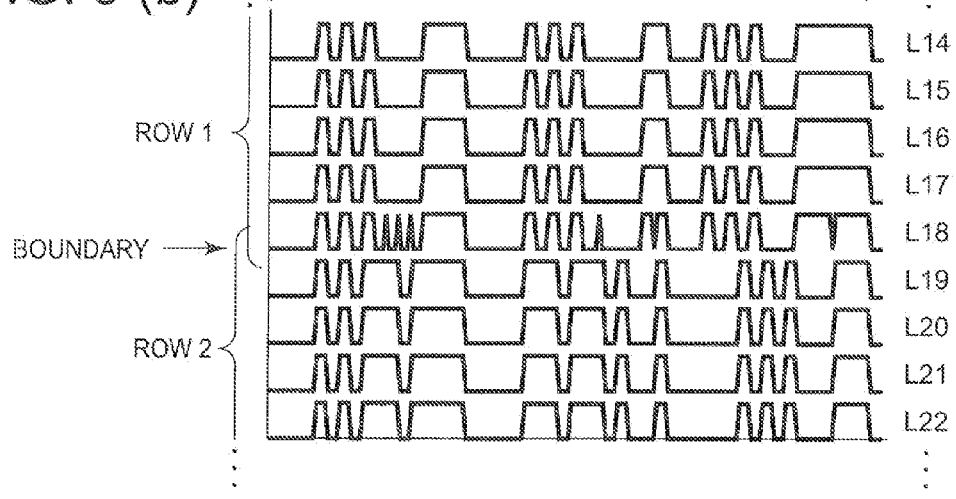
FIG. 10
| LINE GROUP | COMPOSITE LINES | JUDGMENT VALUE |
|---|---|---|
| S1 | L1, L2, L3 | 1 |
| .... | .... | ... |
| S15 | L15, L16, L17 | 1 |
| S16 | L16, L17, L18 | 0 |
| S17 | L17, L18, L19 | 0 |
| S18 | L18, L19, L20 | 0 |
| S19 | L19, L20, L21 | 1 |
| .... | .... | ... |
| S21 | L21, L22, L23 | 1 |
| .... | .... | ... |
| Sn-2 | Ln-2, Ln-1, Ln | 1 |

(b): FIRST ORDER DIFFERENTIATION
(c): SECOND ORDER DIFFERENTIATION
ZERO CROSSING SL

STACKED BARCODE READER AND STACKED BARCODE READING METHOD

The present application claims priority from Japanese Patent Application Nos. JP 2010-227437 filed on Oct. 7, 2010, and JP 2010-227438 filed on Oct. 7, 2010, the disclosures of which are incorporated herein by reference in their entirety.

FIELD OF THE INVENTION

The present invention relates to a stacked barcode reader that optically reads stacked barcodes and relates to a stacked barcode reading method.

DESCRIPTION OF RELATED ART

As a conventional means to give specific data to a paper or plastic medium and be automatically recognized, a barcode in which character data is coded into a barcode and displayed by bars and spaces has been widely used. For example, a 1-dimensional barcode is used for customer goods. In recent years, a 2-dimensional barcode which has greater capacity (data density) than the 1D barcode has been introduced responding to a demand to increase the data amount in barcodes. A reading device responding to this 2D barcode has gradually become widespread.

Among the 2D barcodes, there is a type in which 1D barcodes are stacked up on each other to increase the capacity for data amount. This is called a stacked barcode. A stacked barcode with a coding scheme called a PDF417 represents this type. Note that PDF417 with this coding scheme is standardized internationally as ISO/IEC15438.

As a reading device to read such stacked barcodes, a data symbol reader is disclosed in Unexamined Japanese Patent Application Tokkai H8-241369 ("Tokkai H8-241369"). The data symbol reader disclosed in Tokkai H8-241369 captures an image of a stacked barcode with a 2D image pickup device and indicates the quality status of the stacked barcode by number values so that the deteriorated condition of the stacked barcode can be known.

However, if the resolution of the image pickup optical system that scans stacked barcodes is not at a predetermined level, a scanned reflection coefficient waveform of the stacked barcode deviates. For this reason, it is a problem that a boundary between a bar and a space cannot be accurately detected due to the deviated scanned reflection coefficient waveform. Consequently, accuracy of reading the stacked barcode may be degraded.

SUMMARY OF THE INVENTION

An objective of the present invention, then considering such a problem, is to provide a stacked barcode reader that is minimally affected by the deviation of the scanned reflection coefficient waveform of the stacked barcode to accurately read the stacked barcode, and a stacked barcode reading method.

To achieve the objective, a stacked barcode reader of the present invention comprises an image pickup section that captures an image of a stacked barcode in which character data is coded into a barcode and displayed by bars and spaces, an image memory that stores the image data of the stacked barcode captured by the image pickup section, and a data processing section that has a decoding section for decoding the barcode of the stacked barcode into the character data; wherein the decoding section has a threshold calculating means that calculates a threshold value to measure the line widths of the bars and the spaces of the stacked barcode with the brightness values of multiple pixels that configure the image data, an n-th order differentiation value calculating means that calculates an n-th order differentiation value (n=1 or 2) by performing an n-th order differentiation on a scanned reflection coefficient waveform that shows the brightness values of the multiple pixels of the image data, a line width measuring means that measures the line widths of multiple bars and spaces of the stacked barcode based on the threshold or the n-th order differentiation value, a T-sequence measuring means that measures a T-sequence from the line widths of the bars and the spaces of the stacked barcode, measured by the line width measuring means, and a code word obtaining means that obtains the code word corresponding to the T-sequence measured by the T-sequence measuring means.

The stacked barcode reader of the present invention is further featured by the fact that the n-th order differentiation value is a secondary differentiation value, and zero crossing points of the secondary differentiation values are taken as boundaries between the bars and the spaces.

The stacked barcode reader of the present invention is further featured by the fact that the threshold value is either a fixed threshold obtained based on the average value of the image data or a local threshold value obtained based on the average value of the maximum peak value and the minimum peak value of the neighboring bar and space of the image data.

A stacked barcode reading method of the present invention for decoding the barcode data of the stacked barcode into the character data based on the image data obtained by capturing an image of the stacked barcode in which the character data is coded into a barcode and displayed by bars and spaces, comprises a threshold calculating step that calculates a threshold used for measuring the line widths of the bars and the spaces of the stacked barcode with the brightness values of multiple pixels which configure the image data, an n-th order differentiation value calculating step that calculates an n-th order differentiation value (n=1 or 2) by performing an n-th order differentiation on a scanned reflection coefficient waveform showing the brightness values of the multiple pixels that configure the image data, a line width measuring step that measures the line widths of the bars and the spaces of the stacked barcode based on the threshold value or the n-th order differentiation value, a T-sequence measuring step that measures the T-sequence from the line widths of the bars and the spaces of the stacked barcode which is measured in the line width measuring step, and a code word obtaining step that obtains the code word corresponding to the T-sequence measured in the T-sequence measuring step.

The stacked barcode reading method of the present invention is further featured by the fact that validity of the T-sequence is judged according to whether or not a cluster number calculated from the T-sequence measured in the T-sequence measuring step is equal to the theoretical value of the cluster.

Also, to achieve the objective, a stacked barcode reader of the present invention comprises an image pickup section that captures an image of a stacked barcode in which character data is coded into a barcode and displayed by bars and spaces, an image memory that stores the image data of the stacked barcode captured by the image pickup section, and a data processing section that has a decoding section for decoding the barcode of the stacked barcode into the character data; wherein the decoding section has a line width calculating means that calculates the line widths of multiple bars and spaces of the stacked barcode with the brightness values of the multiple pixels which configure the image data, a priority deciding means that decides the priority of T-sequence based on the evaluation value of the frequency distribution of the multiple line widths calculated by the line width calculating means, a T-sequence measuring means that measures the T-sequence according to the priority of T-sequence determined by the priority deciding means, and a code word obtaining means that obtains the code word corresponding to the T-sequence measured by the T-sequence measuring means.

The stacked barcode reader of the present invention is further featured by the fact that the line width calculating means has a binary threshold calculating means that calculates a binary threshold value based on the scanned reflection coefficient waveform showing the brightness values of the multiple pixels that configure the image data, and an n-th order differentiation calculating means for calculating n-th order differentiation values (n is 1 or 2) by performing an n-th order differentiation on the scanned reflection coefficient waveform that shows the brightness values of the multiple pixels which configure the image data.

The stacked barcode reader of the present invention is further featured by the fact that the evaluation value is a maximum value of the frequency distribution.

The stacked barcode reader of the present invention is further featured by the fact that the evaluation value is a variance of the frequency distribution.

The stacked barcode reader of the present invention is further featured by the fact that the priority order deciding means determines the priority of T-sequence from the highest sharp edge of the frequency distribution of the line widths.

A stacked barcode reading method of the present invention for decoding the barcode data of the stacked barcode into the character data based on the image data obtained by capturing the image of the stacked barcode in which the character data is coded into a barcode and displayed by bars and spaces, comprises a line-width calculating step that calculates the line widths of multiple bars and spaces in the stacked barcode with the brightness values of the multiple pixels which configure the image data, a priority order deciding step that determines the priority of T-sequence based on the evaluation values of the frequency distribution of the multiple line widths calculated in the line width calculating step, a T-sequence measuring step that measures T-sequence according to the priority order of the T-sequence which is determined in the priority order deciding step, and a code word obtaining step that obtains the code word corresponding to the T-sequence measured in the T-sequence measuring step.

The stacked barcode reading method of the present invention is further featured by the fact that, in the priority order deciding step, the priority of the T-sequence is determined from the highest sharp edge of the frequency distribution of the line widths.

According to a stacked barcode reader and a stacked barcode reading method of the present invention, a stacked barcode can be accurately read while minimally affected by the deviation of a scanned reflection coefficient waveform of the stacked barcode.

According to the stacked barcode reader and stacked barcode reading method of the present invention, the priority order of T-sequence is determined based on the evaluation values (the maximum value, variance or the like) of the frequency distribution of the line widths of the bars and the spaces which configure the stacked barcode; therefore, despite the resolution of the image pickup optical system, the number of errors in all the decoded code words is reduced to improve the reading performance of the barcode reader on the stacked barcode. Consequently, while being minimally affected by the deviation of the scanned reflection coefficient waveform of the stacked barcode, the stacked barcode can be read more accurately.

BRIEF DESCRIPTION OF THE DRAWINGS

FIG. 2($b$) shows a block diagram of a low-level decoding section of a stacked barcode reader of Embodiment 2;

FIG. 3 shows a diagram showing an example of a stacked barcode;

FIG. 4 shows an enlargement of a big bar portion and its periphery in a start pattern of the stacked barcode;

FIG. 9 shows waveforms showing the pixel value of each line in the horizontal direction of the corrected image data;

FIG. 10 shows an explanatory diagram to explain how to specify the segments of rows of the stacked barcode;

FIG. 11($b$) shows a flow chart of a low-level decoding of Embodiment 2 of the present invention;

FIG. 17($b$) shows a graph showing frequency distributions of the element widths of the stacked barcode in Embodiment 2, which shows that the maximum value of the frequency distribution of the line widths of the bars and the spaces by the second order differentiation method (Method 2) is larger than that obtained by the fixed threshold scheme (Method 1)

DETAILED DESCRIPTION OF EMBODIMENTS

Figure 1:
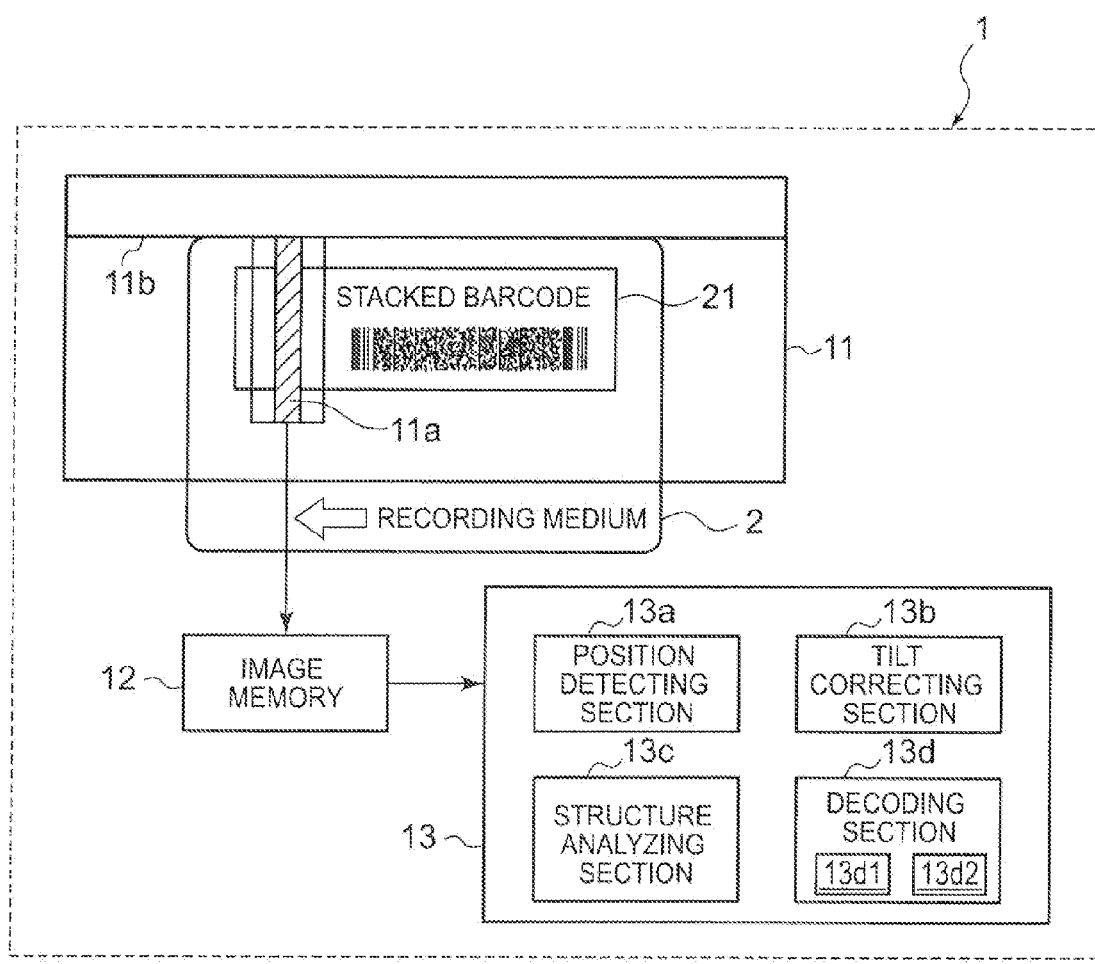
FIG. 1 shows a block diagram of an electrical configuration of a stacked barcode reader of Embodiment 1 of the present invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Embodiment 1 of the Invention

FIG. 1 through FIG. 16 show an embodiment 1 of the present invention. In Embodiment 1, an image pickup device 11 is used for an imaging section; a data processing device 13 is used for an data processing section; a threshold calculating means 14a is used for a line width calculating means; a fixed threshold calculating means 14a1 and a local threshold calculating means 14a2 are used for a binary threshold calculating means; a T-sequence measuring section 15 is used for a T-sequence measuring means; a code word converting section 16 is used for a code word obtaining means; and a priority order deciding section 17 is used for a priority order deciding means.

Stacked Barcode Reader

Figure 2:
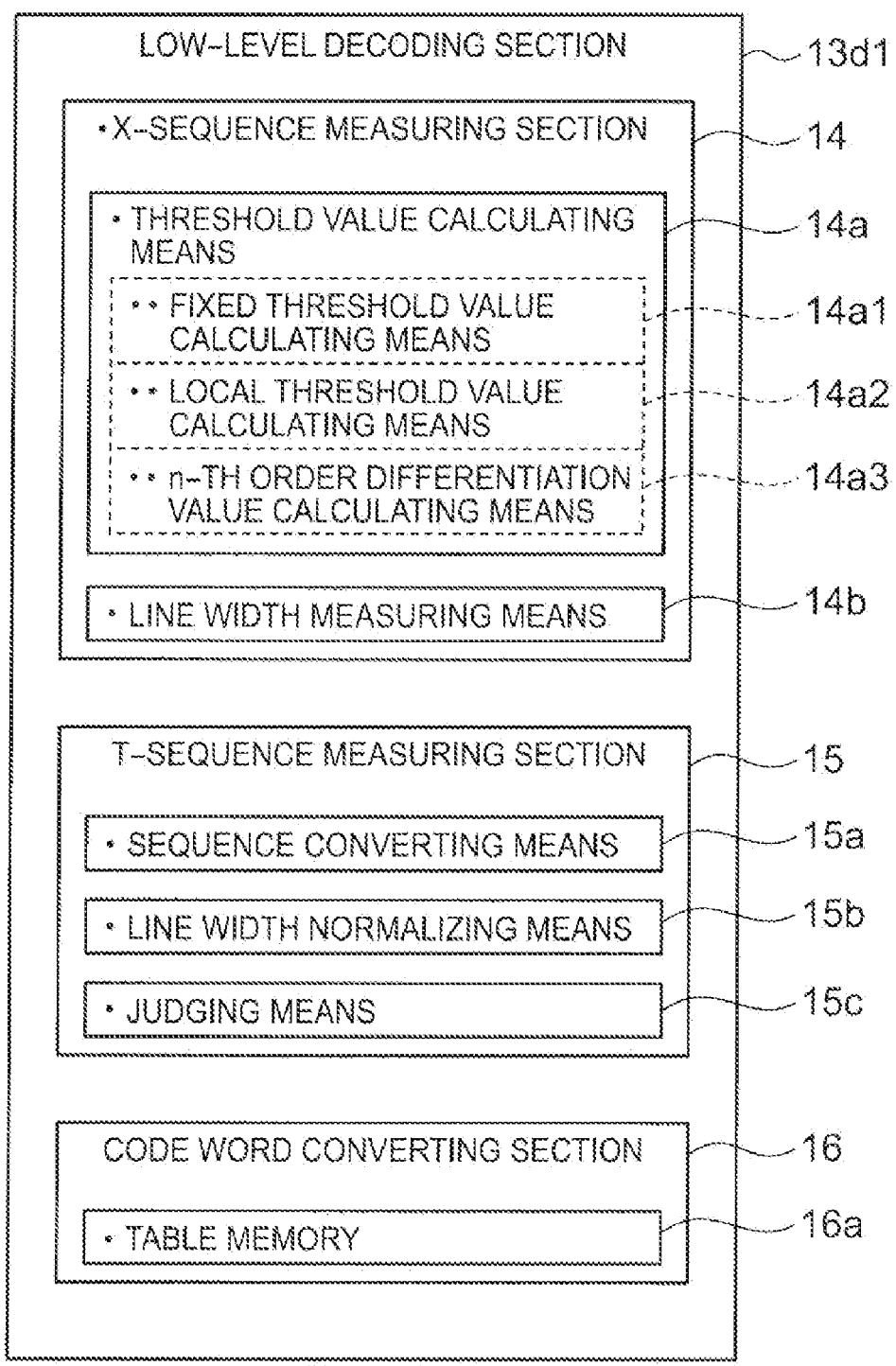
FIG. 2($a$) shows a block diagram of a low-level decoding section of the stacked barcode reader of Embodiment 1.
Figure 2:
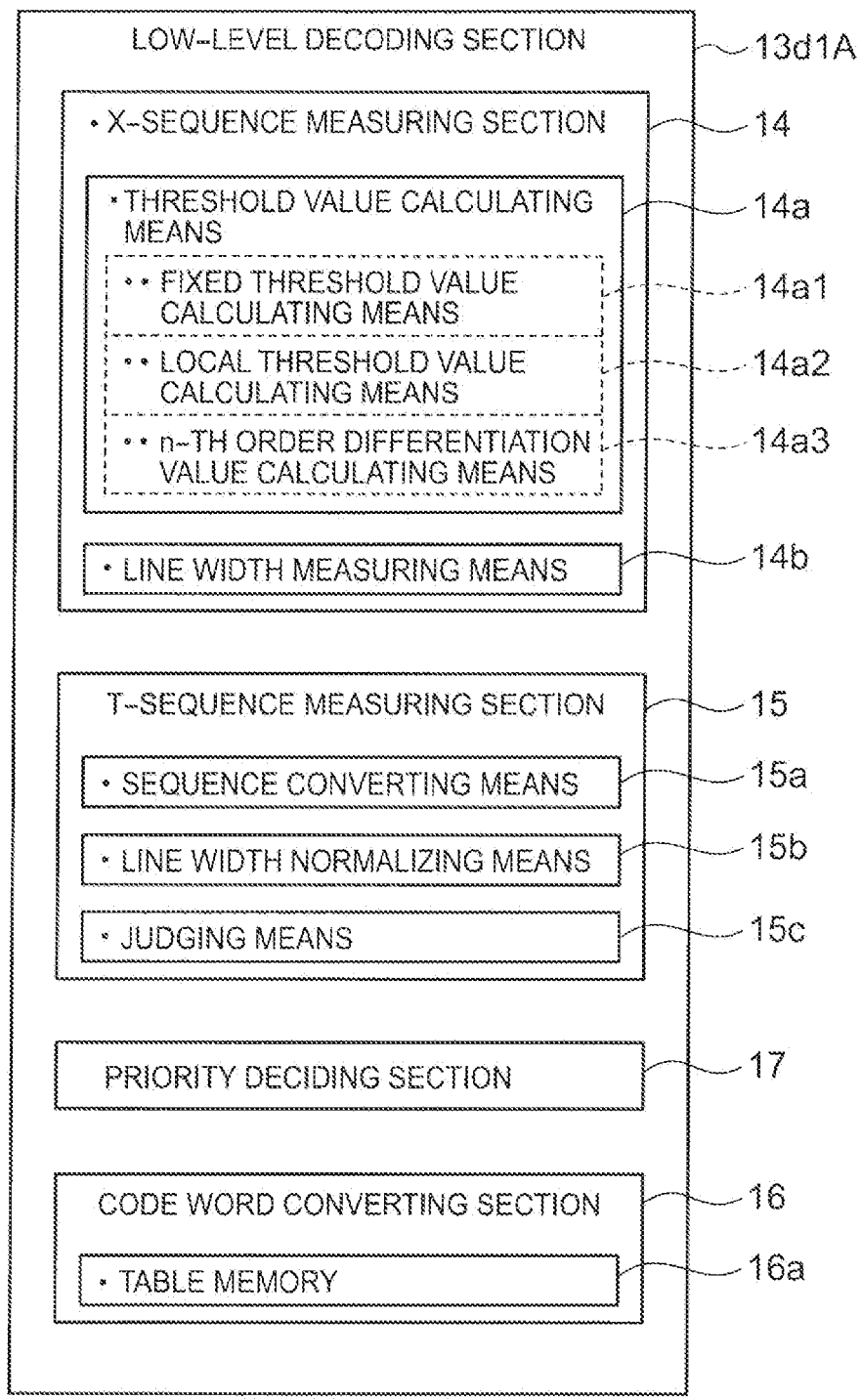

FIG. 1 is a block diagram of an electrical configuration of a stacked barcode reader 1 of an embodiment 1 of the present invention. FIG. 2 (a) is a block diagram of a low-level decoding section of the stacked barcode reader of Embodiment 1.

In FIG. 1, the stacked barcode reader 1 is equipped with an image pickup device 11 that has a close-contact type image scanner 11a and a card transport mechanism 11b, an image memory 12 and a data processing device 13. The data processing device 13 has a position-detecting section 13a, a tilt-correcting section 13b, a structure-analyzing section 13c and a decoding section 13d. Also, a stacked barcode 21 which is a type of 2D barcode is printed on a recording medium 2 such as a card. The decoding section 13d has a low-level decoding section 13d1 and a high-level decoding section 13d2.

The image scanner 11a of the image pickup device 11 obtains image data by converting the reflection of the light that has been irradiated on a stacked barcode printed on the recording medium 2 into electrical signals through photoelectric conversion. The obtained image data of the stacked barcode 21 is stored in the image memory 12. The data processing device 13 retrieves the image data of the stacked barcode 21 from the image memory 12 and performs various processing on the retrieved image data.

The low-level decoding section 13d1 is equipped with an X-sequence measuring section 14, a T-sequence measuring section 15, a priority order deciding section 17 and a code word converting section 16, as shown in FIG. 2 (a).

The X-sequence measuring section 14 has a threshold calculating means 14a and a line width measuring means 14b. The threshold calculating means 14a consists of a fixed threshold calculating means 14a1, a local threshold calculating means 14a2 and an n-th order differentiation calculating means 14a3.

The T-sequence measuring section 15 has a sequence converting means 15a, a line width normalizing means 15b and a judging means 15c. The sequence converting means 15a functions to convert the line width array calculated in the X-sequence to a T-sequence line width array. Also, the judging means 15c functions to compare a cluster value with a logic value, which is described later.

The code word converting section 16 has a table memory 16a that stores a code word conversion table showing the relationship between the T-sequence and the code word.

Stacked Barcode: The Structure of PDF417

FIG. 3 is a diagram showing an example of the stacked barcode 21 (a label structure in a stacked barcode called a PDF417).

In FIG. 3, the stacked barcode 21 consists of a vertical direction (Y direction) which is a row direction (the direction in which multiple rows are arranged) and a horizontal direction (X direction) which is a column direction (the direction in which multiple columns are arranged), and is divided into five sections in the column direction. In other words, as shown in FIG. 3, the stacked barcode 21 is divided into 5 columns: a data column is positioned in the center; on the left and right sides of the data column, a left row indicator and a right row indicator are arranged; further outside the indicators are a start pattern and a stop pattern. The barcodes configuring each column are composed of black bars and white spaces, and a bar of wider width called a big bar is formed as part of the start pattern and the stop pattern. In FIG. 3, the big bar is black and is the widest bar, located on the left of both the start pattern and the stop pattern.

As shown in FIG. 3, the data column, the left row indicator and the right row indicator are respectively composed of six rows (row 1 to row 6) in the row direction. The three columns (the data column, the left row indicator and the right row indicator) that configure a row respectively contain one code word. For example, a data column of the stacked barcode 21 has 6 code words which are configured by one code word (per 1 data column)×6 rows. Note that a code word is a value expressing a certain number, character or other symbol, or a basic unit to code the value associated with those.

Each column except the stop pattern is configured such that there are four bars and four spaces and each line width is an integral multiple of the minimum width which is called a module (unit). Also, the line width of one code word is composed of seventeen modules; the maximum unit of each bar or space is six. Note that the stop pattern is configured by five bars and four spaces and the line width of one code word is made up of eighteen modules.

Note that the stacked barcode 21 shown in FIG. 3 has only one data column; however, the present invention is not limited to this, but may have multiple data columns.

A stacked barcode reading method of Embodiment 1 of the present invention is described hereinafter.

Stacked Barcode Reading Method

Figure 5:
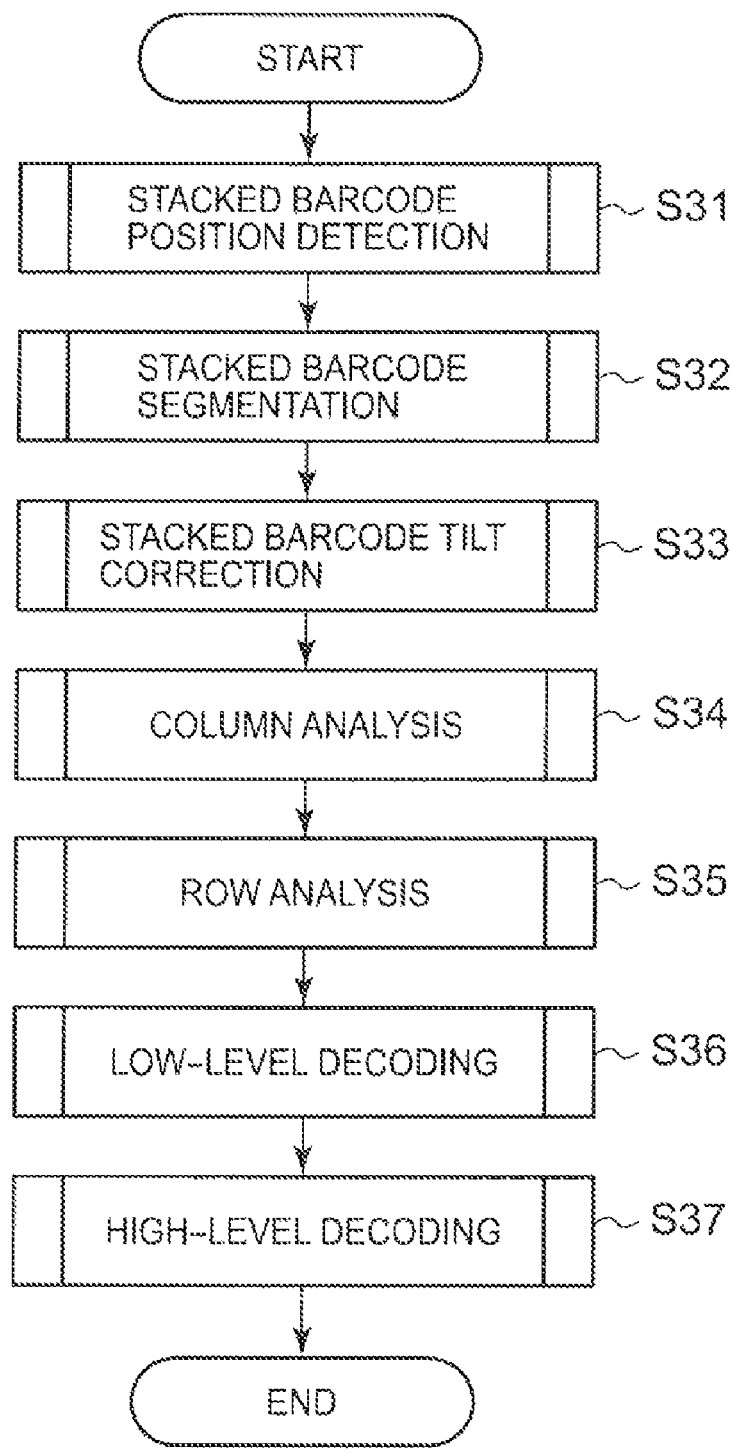
FIG. 5 shows a flow chart of a stacked barcode reading method of Embodiment 1 of the present invention.

FIG. 5 is a flow chart of a stacked barcode reading method of Embodiment 1. Referring to FIG. 5, the flow of the stacked barcode reading method of Embodiment 1 is described.

First, the position of the stacked barcode 21 is detected (Step S31). More specifically, as shown in FIG. 1, the image scanner 11a of the stacked barcode reader 1 obtains the image data by converting the reflection of the light which has been irradiated on the stacked barcode 21 on the recording medium 2 that has been moved to a predetermined position along the card transport mechanism 11b into electrical signals through photoelectric conversion. Then, the obtained image data of the stacked barcode 21 is stored in the image memory 12. The image memory 12 is composed of a limited number of pixels arranged two-dimensionally. In Embodiment 1, the captured image data of the stacked barcode 21 is created by expressing the brightness value of each pixel (pixel value) by the number values. The brightness value is expressed by the integer values from 0 to 255, for example. Note that the image memory 12 may be any kind such as a RAM, a SDRAM, a DDRS-DRAM or a RDRAM as long as the image data can be stored.

After that, the position detecting section 13a of the data processing device 13 reads the image data stored in the image memory 12 to detect the position of the stacked barcode 21 in the image data.

The stacked barcode 21 whose position is detected in this manner is segmented in the data processing device 13 (Step S32), and the segmented image data is stored in the image memory 12.

Next, a tilt correction of the stacked barcode 21 is performed in the data processing device 13 (Step S33). More specifically described, the tilt correcting section 13b of the data processing device 13 reads the image data segmented in Step S32, that is the image data of the stacked barcode 21 captured as tilted as shown in FIG. 4, and converts the image data into the corrected image data having a zero tilt angle as shown in FIG. 3.

FIG. 4 is an enlargement of the big bar and its periphery in the start pattern of the stacked barcode 21. Also, FIG. 4 shows that the stacked barcode 21 is captured as tilted by the image scanner 11a of the image pickup device 11. When the stacked barcode 21 is scanned by the image pickup device 11, the row direction of the stacked barcode 21 is not always positioned in a perpendicular relationship with respect to the card transport mechanism 11b. The image data read by the image scanner 11a may tilt as shown in FIG. 4, for example. In other words, the row direction does not agree with the vertical direction of the image data stored in the image memory 12. In such a case, the read image data comes to agree with the X direction and the Y direction as shown in FIG. 4 through the coordinate conversion, that is, the conversion of the image data is done between the pixels. However, noise due to quantization error which is caused at such a coordinate conversion degrades decoding reliability. Therefore, according Embodiment 1, an interpolation process or an averaging process is performed on the image after the coordinate conversion for a smoothing purpose; therefore, the influence of such noise can be reduced.

Next, a structure analysis (a column analysis and a row analysis) is performed in the data processing device 13 (Step S34, S35). More specifically described, the structure analyzing section 13c of the data processing device 13 analyzes the structure of the stacked barcode based on the image data which has been corrected in Step S33. In the structure analyzing section 13c, a column analysis (Step S34) and a row analysis (Step S35) are performed.

Finally, a decoding process is performed in the decoding section 13d of the data processing device 13 (Steps S36 and S37). More specifically described, the decoding section 13d of the data processing device 13 performs a decoding process on the stacked barcode 21 based on the structure of the stacked barcode 21 which is analyzed in Steps S34 and S35. At that time, two decoding processes, a low-level decoding process and a high-level decoding process, are performed on a PDF417 which is a type of the stacked barcode 21: a low-level decoding process is performed in the low-level decoding section 13d1 of the decoding section 13d (Step S36) and a high-level decoding process is performed in the high-level decoding section 13d2 (Step S37). The low-level decoding process is performed so that the code word configured by the bar line widths and the space widths in the data column is temporarily converted into an intermediate data format expressed by 929 codes which use the values from 0 to 928. Next, the high-level decoding process is performed so that, after temporarily converted to the intermediate data expressed by 929 codes, the code word is decoded into a final language based on a predetermined rule. The final language for the PDF417 may be the ASCII character set, binary expressions or other characters.

Each processing in the flow chart shown in FIG. 5 (Step S31 through Step S37) is individually described in detail hereafter.

Stacked Barcode Position Detection

Figure 6:
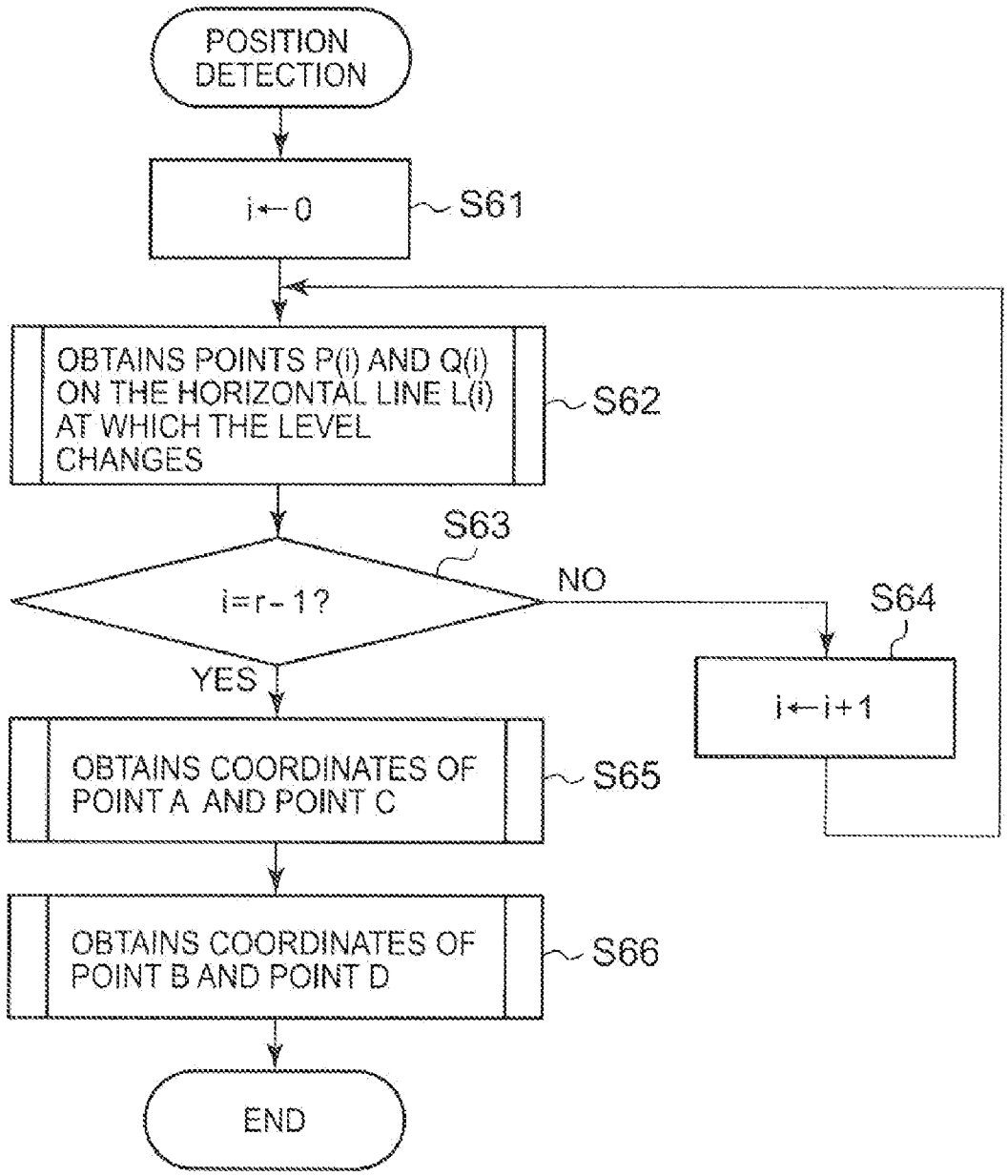
FIG. 6 shows a detailed flow chart of the stacked barcode position detection, stated in the flow chart of FIG. 5.

FIG. 6 is a detailed flow chart of a stacked barcode position detection (Step S31), stated in the flow chart shown in FIG. 5. Also, FIG. 4 is an enlargement of the big bar and its periphery in the start pattern.

In FIG. 6, the variable i (i is an integer) is substituted by 0 for initialization and then the reading is returned to the pixel in the original position (Step S61).

More specifically described, FIG. 4 shows that a predetermined original position is the pixel S at the upper left corner in the area surrounding a portion of the stacked barcode 21 in the image data stored in the image memory 12 is the pixel in a predetermined original position. In Step S61, taking a row of one pixel in the horizontal direction HL (X direction) as a horizontal line HL (0), the image data of the first pixel S is read.

Next, regarding the first pixel column extending in the vertical direction (Y direction) from the horizontal line HL (0), the image data is read on every pixel in the X direction on the horizontal line HL (i) where Y=i, to search the point (the point P(i)) at which the image changes from "light" to "dark" for the first time. More specifically described, the image data in each pixel is sorted into the pixel indicating the "light" (white portion) (hereinafter called a "space") in which the brightness value is higher than a predetermined threshold or the pixel indicating the "dark" (black portion) (hereinafter called a "bar") in which the brightness value is lower than a predetermined threshold to detect the position of the pixel which has a transition from space to bar for the first time. The position of the pixel that changes in this way is a boundary between the space and the bar.

The same horizontal line HL(i) is continually searched to detect the point at which the image changes from the "dark" to the "light" for the first time (point Q(i)). More specifically described, the position of the pixel which has a transition from a bar (the pixel indicating "dark") to a space (the pixel indicating "light") is detected (Step S62).

Next, it is judged whether or not the equation i=r−1 (r: a matrix (dpi) in the Y direction in FIG. 4) is satisfied (Step S63); when it is judged that the equation is not satisfied, i is incremented by 1 (Step S64) and the process of Step S62 is performed again. On the other hand, when the brightness value of each pixel is searched in the X direction starting from the pixel S shown in FIG. 4 up to the last pixel in the last row, it is judged that the equation i=r−1 is satisfied. When it is judged that the equation is satisfied, the process proceeds to the next step S65. Note that the r number of points (P(i), Q(i)) (i=0, 1, . . . , r−2, r−1) are found at this point of process.

Next, coordinates are obtained for point A and point C in FIG. 4 (Step S65).

More specifically described, the positions of the pixels corresponding to point A and point C are detected. The equation $d(i)=|P(i)-Q(i)|$ is calculated in the X direction to obtain the minimum value, min (d(i)), of d(i). This min(d(i)) corresponds to two points, A and C, of the big bar at which the distance between P and Q is shortest (see FIG. 4). With this, the Y coordinates of points A and C (the positions of the pixels in the Y direction) are respectively Ay=max(i) and Cy=min(i). Also, since the X coordinates of points A and C (the positions of the pixels in the X direction) are the X coordinates of point P for each i, which are the X coordinate of Ax=P(i=Ay) and the X coordinate of Cx=P(i=Cy).

Next, the coordinates of points B and D in FIG. 4 are obtained (Step S66). More specifically, the range of i in which d (i) is constant is specified. And the Y coordinates of points B and D of the big bar are respectively, min(i) and max(i) in the range. The X coordinates of points B and D are the X coordinates of points P and Q for each i, which are the X coordinate of Bx=P(i=By) and the X coordinate of Dx=Q (i=Dy).

Through the processes from Step S61 to Step S66, the four corners of the big bar, which are the coordinates of point A, point B, point C and point D are determined; therefore, the tilt angle can be calculated by "a tan ((Ay−Dy)/(Ax−Dx))".

Note that, referring to FIG. 4, in order to increase accuracy of detecting the tilt angle, the same operations are performed while having the roles of X and Y switched, to obtain the four corners of the big bar, which are the coordinates of point A', point B', point C' and point D', and the averages with the above points A, B, C, and D are taken as the final coordinates.

In FIG. 6, the coordinates of point A and point C are obtained (Step S65) as well as the coordinates of point B and point D (Step S66); however, the present invention is not limited to this, but only the coordinates of point A and point C are obtained to detect the tilt.

Segmentation of Stacked Barcode

When the coordinates of the four corners of the big bar are determined through Steps S61 through S66, a segmentation of the stacked barcode 21 is performed (Step S32). Note that the stacked barcode is segmented into a rectangular shape slightly larger than the entire barcode.

Tilt Correction on Stacked Barcode

Next, a title correction is performed on the stacked barcode 21 (Step S33).

FIG. 3 is a diagram showing the image data of the stacked barcode 21 in which the image data tilted by the above-described angle (=a tan ((Ay−Dy)/(Ax−Dx))) is converted to the corrected image data having a tilt angle of zero. In other words, the image data of the stacked barcode 21 shown in FIG. 3 is (a corrected image) in which its column direction and row direction coincide with the horizontal direction (X direction) and vertical direction (Y direction) of the image memory 12 area, shown in FIG. 4.

In FIG. 3, the image data is converted to the corrected image data having a tilt angle of zero by using the title angle of the stacked barcode 21. For example, the conversion can be carried out by a known method such as an affine transformation. Therefore, its detailed description is omitted here.

In a stacked barcode reading method of Embodiment 1, an interpolation process or an averaging process is performed on the image after the coordinate conversion for a smoothing purpose so that the influence of quantization error due to the coordinate conversion is minimized. More specifically described, the brightness value of each pixel is, as shown in FIG. 9 (b) and FIG. 12, either the brightness value indicating a space (100, for example) or the brightness value indicating a bar (0, for example). Note that the corrected image data is smoothed through various filters such as a median filter, an edge preservation filter, an adaptive Weiner filter or a moving average filter.

Structure Analysis

Figure 7:
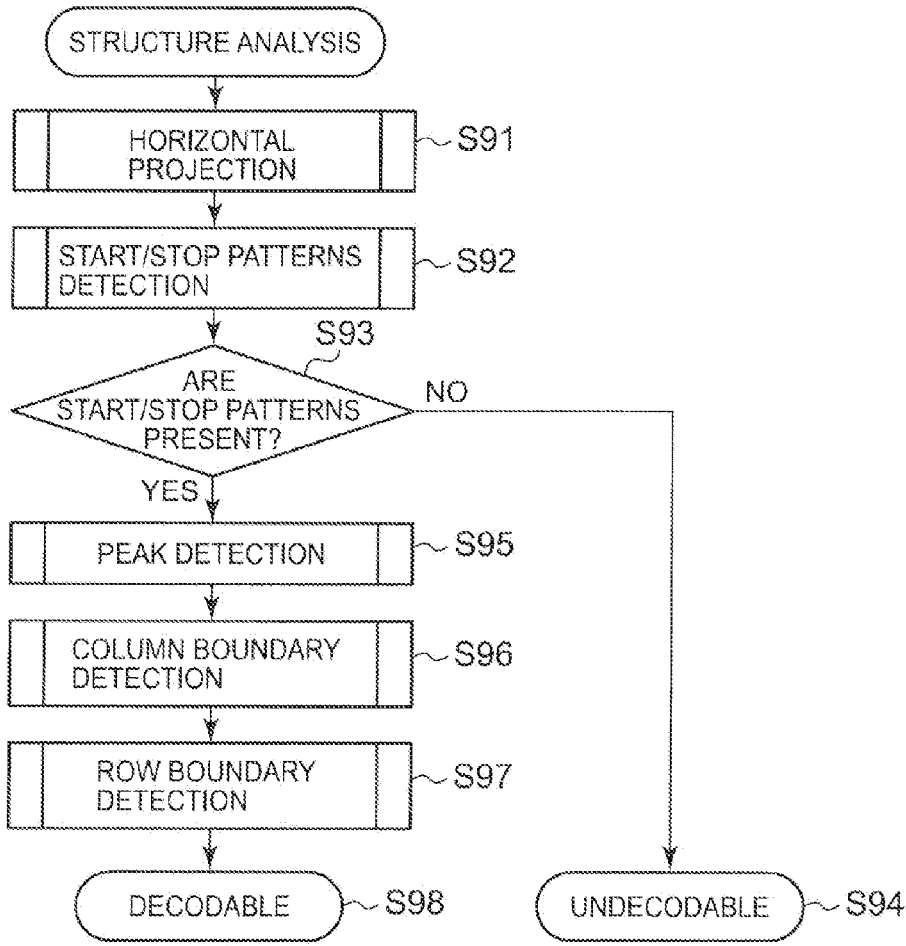
FIG. 7 shows a detailed flow chart of the structure analysis (column analysis and row analysis), stated in the flow chart of FIG. 5.

FIG. 7 is a flow chart of a structure analysis (Steps S34 and S35) found in the flow chart shown in FIG. 5.

In FIG. 7, a horizontal projection is performed first (Step S91). More specifically described, based on the corrected image data of the stacked barcode 21 shown in FIG. 3, the sum of the brightness values of all the pixels arranged in the vertical direction is computed for every pixel arranged in the horizontal direction and stored in the image memory 12.

Then, the difference of the obtained sums of the brightness values is taken between the neighboring pixels in the horizontal direction, which is used for analyzing the start pattern and the stop pattern (Step S92).

As shown in FIG. 3 and the like, the start pattern and the stop pattern, different from the code words of the data column, the left row indicator and the right row indicator, are universal patterns in all the rows (six rows in Embodiment 1); therefore, the start pattern and stop pattern are averaged through the horizontal projection, being less affected by non-uniform brightness and uncleanness of the barcode and enabling more stable detection.

Figure 8:
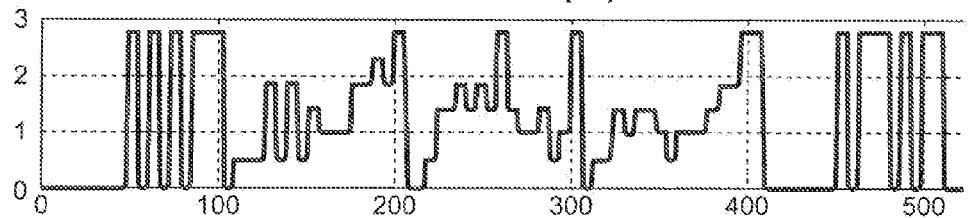
FIG. 8 shows graphs obtained through a predetermined process performed on the corrected image data (see FIG. 3)
Figure 8:
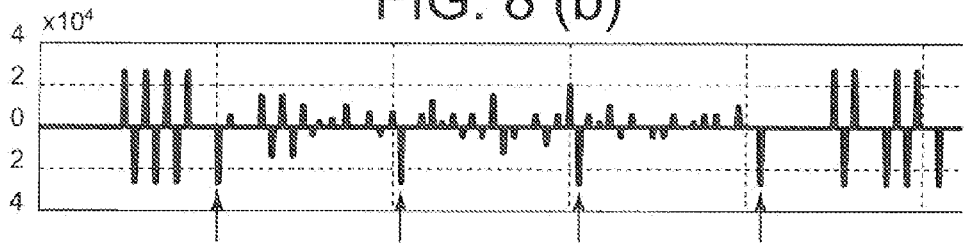

FIG. 8 shows the corrected image data (see FIG. 3) on which a predetermined process has been performed. More specifically described, FIG. 8 (a) shows the calculation of the projection of each pixel of the corrected image data (see FIG. 3) in the vertical direction, and if referring to FIG. 3, is a distribution of the sum of the brightness values of all the pixels in the row direction of the stacked barcode. FIG. 8 (b) shows the calculation of the difference about the graph of FIG. 8 (a). More specifically, the difference of the obtained sum of the brightness values is taken between the neighboring pixels in the horizontal direction of the image data stored in the image memory 12 and the distribution of the difference values are expressed. With this, the positions of the pixels in which there was a transition from the bar (or space) to the space (or bar) on the horizontal line L (i) can be detected.

For detecting the start pattern, the distance (run length) between the points at which bar and space are switched from the one to the other (hereinafter called "line width") is measured by using the graph of FIG. 8 (a) or FIG. 8 (b). In this embodiment, the line width is measured by counting the number of the pixels in the horizontal direction. For example, when the line width of each bar and the width of each space in the start pattern are measured, the line width array expressed by "StartWork=[47, 6, 5, 6, 7, 6, 6, 18]" is obtained. The length ratio between the bar and the space in the start pattern is as in the line width array shown in "StartMark=[8, 1, 1, 1, 1, 1, 1, 3]" by the PDF 417 standard. A normalized correlation R can be used for the index to study the similarity between them. The normalized correlation R for FIG. 8 (b) is "R=corrcoef (StartWork, StartMark)=0.9993", which is very close to 1. Therefore, in this case, it is judged that the start pattern is correctly detected. Note that the normalized correlation R of the stop pattern is the same as that of the start pattern, so its description is omitted here.

Note that although a normalized correlation R is used for the index of similarity in Embodiment 1, the present invention is not limited to this, but a sum of absolute difference or a sum of products may be used.

After it is judged whether or not the start/stop patterns are accurately detected in the above manner, the process proceeds to the step S95 when it is judged that the start/stop patterns are accurately detected. On the other hand, when it is judged the start/stop patterns are not accurately detected, it is judged that the data cannot be decoded (Step S94).

Referring to the graph of FIG. 8 (b), a peak detection is performed next (Step S95). More specifically described, as shown in FIG. 3, in the start pattern, the left row indicator, the data column, the right row indicator and the stop pattern, there are transitions from the space to the bar in all the rows at each column boundary; therefore, large difference values appear at those portions on the distribution of the difference values of the horizontal projection (the upward arrows in FIG. 8 (b)). To obtain the difference values (peak values) indicated by the upward arrows of FIG. 8 (b), a proper threshold value is used to judge the presence of peak by observing whether the value exceeds the threshold value. When judged as a peak, the position of the pixel that has the peak value is stored in the image memory 12.

Next, a column boundary detection is performed (Step S96). More specifically, based on the positions of the pixels that have the peak values, stored in the memory in Step S95, five column boundaries are detected in the start pattern, the left row indicator, the data column, and the right row indicator. Also, the distance between the pixels having the neighboring peak values indicates the width of the column, and is stored in the data memory 12 in the same manner. When the boundary vicinity in a certain row is unclean, the change point indicating each column boundary may be not detected correctly during the row scanning; however, by using the horizontal projection as in Embodiment 1, the influence of uncleanness is reduced by the averaging effect, reducing the bad influence on the detection of each column boundary.

Next, a row boundary detection is performed (Step S97). It is described more specifically, referring to FIG. 9 and FIG. 10. FIG. 9 shows waveforms of the brightness of the lines L in the horizontal direction of the averaged, corrected image data. FIG. 10 is an explanatory diagram to explain how to specify the segmentation of each row of the stacked barcode 21. Note that in Embodiment 1, a single line L is a matrix of 1 row×n columns. Here, n is a width of the evaluation range.

In FIG. 9 (a), for detecting boundaries between rows, groups respectively consisting of multiple consecutive lines L are set on the corrected image data. For example, a group consisting of the three consecutive lines L(1), L(2) and L(3) (hereinafter called "L1, L2 and L3") is established (as a line group S1) (see FIG. 10). Note that although the three consecutive lines L are used in Embodiment 1, the present invention is not limited to three lines.

Then, two lines are arbitrarily selected from the three lines L and their normalized correlations are obtained, which are three correlation values (L1 and L2, L1 and L3 and L2 and L3) in total. When the smallest value of the three correlation values is larger than a pre-determined threshold value, r0, it is judged that the waveforms (that show the brightness of each pixel in the line L) of the L1, L2 and L3 are correlated with each other and a 1 is given to the line group S1 (see FIG. 10). On the other hand, when it is smaller than the threshold value, r0, it is judged that the waveforms of the two lines L from which the smallest correlation value is obtained are at least not correlated and a 0 is given to the line group S1.

As for the group consisting of the lines L1, L2 and L3 which are formed in the horizontal direction, the lines L1, L2 and L3 are all contained in the same row 1 (the top row) as shown in FIG. 9 (b); therefore, the smallest value of the nine correlation values is larger than the threshold value, r0, and a 1 is given to this group (the judgment value of the line group S1 is 1 in FIG. 10).

Next, on the corrected image data, the above-described group is relatively moved in the row direction (vertical direction) (to take a line group S2 consisting of L2, L3 and L4, for example), a correlation array is calculated, and it is judged whether or not the minimum value of the calculated correlation array is larger than the threshold value, r0, and accordingly the line group is given the judgment value, 0 or 1.

In the same manner, the above-described process (a process to give an evaluation value) is repeated down to the lines Ln-2, Ln-1 and Ln (a line group Sn-2), and a series made up of 1s and 0s of total number n-2 is obtained (right column in FIG. 10).

When the three lines L are selected from the same row, a line group consisting of the three lines L has an evaluation value close to 1; when the three lines L are selected from the neighboring rows, a line group consisting of the three lines L has a relatively small value. More specifically described referring to FIG. 9 (b), any line L above the line L18 belongs to the row 1 and any line L below the line L18 belongs to the row 2; thus, the line L18 is the line L positioned on the boundary between the row 1 and row 2.

Therefore, in the line groups S16 through S18 that contain the line L18, the judgment value is close to 0; in other line groups, the judgment value is 1 (see FIG. 10). The line group having the judgment value close to 0 indicates the position in which the rows change; therefore, the series of the judgment value is scanned and the position where the judgment value is close to 0 is specified as the row-changing position. Note that since the similarity among the lines L is evaluated through correlation function in this embodiment 1, unnecessary computations (calculation cost) can be eliminated by evaluating only the range in each row in the start pattern and the stop pattern excluding the common patterns (such as the same line widths of the bar and the space), as shown in FIG. 9 (a).

As described above, the row boundaries are detected in Step S97 in the flow where line groups are set, the correlation array is calculated, the minimum value of the correlation array is compared with the threshold value, a judgment value of 0 or 1 is given and the series of the judgment value is scanned. In Embodiment 1, the detection is performed starting from the row 1 to the last line L of the row 6.

By the detection of the row-boundaries, it is judged to which row each line L of the corrected image data belongs and the image data is determined decodable, and then the process is finished (Step S98).

Also in Embodiment 1, the average of the brightness value of each point in the multiple lines L is calculated for every row that contains the lines L to reduce local noise of the lines L. Further, the averaged brightness value of the pixels is regarded to represent the characteristics of the row and used for a decoding process which is described later. With this, accuracy of decoding can be increased.

Low-Level Decoding

Figure 11:
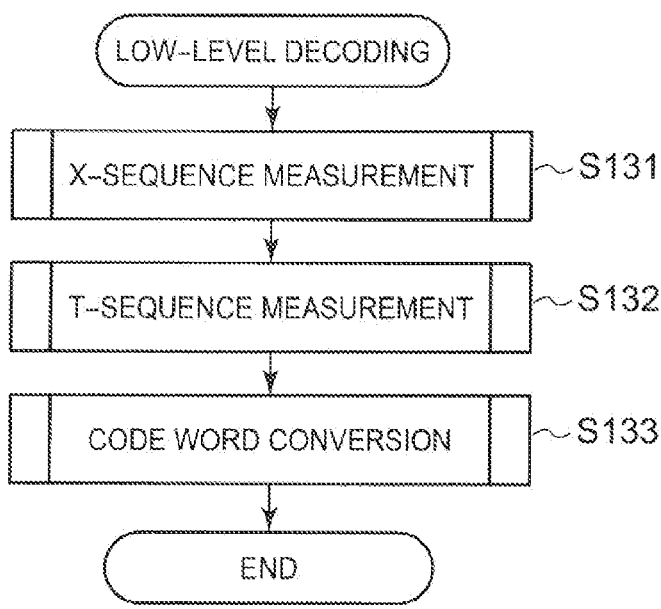
FIG. 11($a$) shows a detailed flow chart of a low-level decoding of Embodiment 1 of the present invention, stated in the flow chart of FIG. 5.
Figure 11:
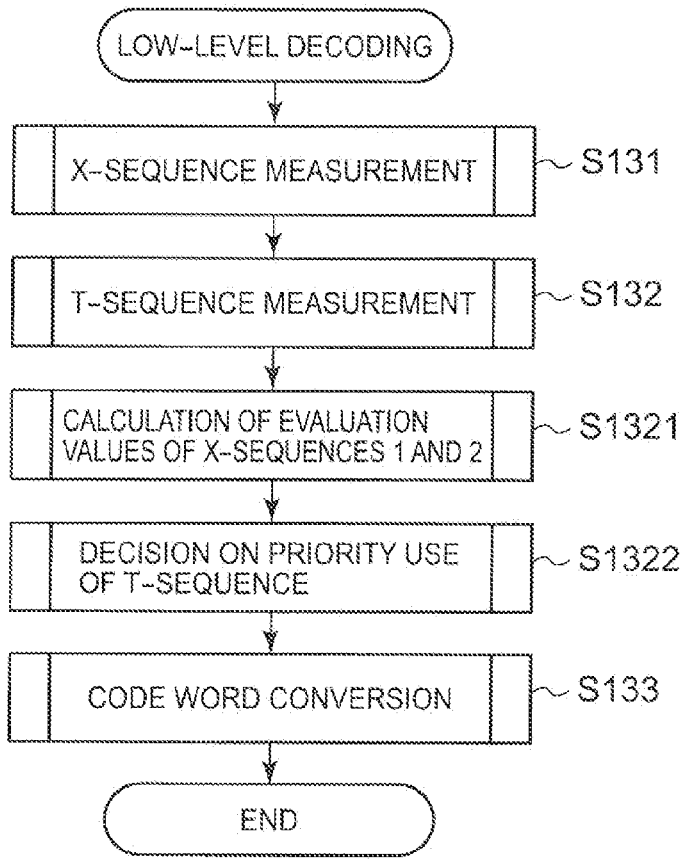

FIG. 11 (a) is a flow chart of a low-level decoding (Step S36) found in the flow chart of FIG. 5 of Embodiment 1.

As shown in FIG. 11 (a), this low-level decoding is performed using the scanned reflection characteristic of each row of the stacked barcode 21. More specifically, it is performed mainly in three steps involving an X-sequence measurement, a T-sequence measurement and a code word conversion. The X-sequence measurement takes out a segment which uses the column boundaries determined by the column analysis as its both ends (that is a scan reflection characteristic) and obtains a numeric series called X-sequence composed by an array of the line widths of bars and the widths of spaces which together configure one column. Next, the T-sequence measurement obtains a numeric series called T-sequence by adding two neighboring bar and space in the X-sequence while shifting one by one. Then, the code word conversion determines a code word corresponding to each T-sequence referring to a code word conversion table that is prepared in advance.

X-Sequence Measurement in Low-Level Decoding

Note that a low-level decoding process and a high-level decoding process are performed on PDF417 which is a type of the stacked barcode 21; the low-level decoding process is a process in which a code word of a column that configures the data column is temporarily converted into intermediate data expressed by 929 codes which uses the numbers 0 to 928. The high-level decoding process decodes the temporarily-converted intermediate data that is expressed by 929 codes into a final language based on a predetermined rule. The final language for PDF417 includes the ASCII character set, binary expressions, or other characters.

In FIG. 11 (a), an X-sequence measuring section 14 of the low-level decoding section 13d1 performs an X-sequence measuring process (Step S131). In a general X-sequence measuring process, a line width-measuring means 14b of the X-sequence measuring section 14 scans a line waveform obtained by averaging the multiple lines L contained in each row to measure the line widths of the bars and the widths of the spaces, and then the line width expressed by the number of pixels is converted to a module count expression to obtain the X-sequence. Note that a scanning line goes along the multiple lines L formed in the center of each row in the row direction, that is a matrix of the pixels composed of the multiple lines. Further, the average of the brightness values of the pixels which configure the multiple lines L is calculated; based on the averaged pixel brightness value (the brightness value obtained through calculation), a decoding process is performed on the scanned reflection coefficient waveform that shows the brightness values of the pixels in the row.

Figure 12:
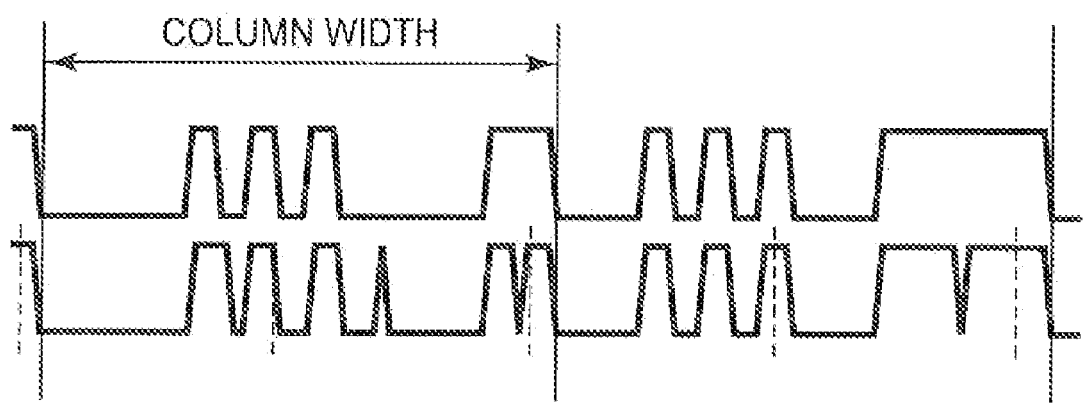
FIG. 12 shows waveforms showing a portion of the scanned reflection coefficient waveform showing the brightness value of each pixel which configures the row of the stacked barcode.

FIG. 12 is a waveform showing a portion of a scanned reflection coefficient waveform of the brightness values of the pixels, which is obtained by scanning the line waveform for which the multiple lines L contained in the row are averaged. Note that the line widths of the bars and the widths of the spaces are obtained by counting the number of pixels between the transition points of the scanned reflection coefficient waveform of the brightness values of the pixels. The transition points here are the points of the scanned reflection coefficient waveform of the brightness values of the pixels intersecting with a predetermined threshold value which is not shown in the figure. The PDF417, a type of the stacked barcode 21 that uses a coding scheme, as shown in FIG. 4, etc., is configured by the start pattern, the left row indicator, the data column, the right row indicator and the stop pattern. Further, each column except the stop pattern consist of four bars and four spaces; therefore, when there is no damage to the scanned reflection coefficient waveform of the brightness values of the pixels, eight line widths are obtained in total.

On the other hand, when there is an abnormality in the scanned reflection coefficient waveform of the brightness values of the pixels, eight or more (nine) line widths are obtained. In such a case, it is understood that there is damage to the column, and a graph indicating that this column has low reliability is set. After performing such an operation to all the columns contained in a certain row, the same process is performed to the next row. When the line widths are obtained from all the rows, the X-sequence measuring process of Step S131 (see FIG. 11(a)) is finished.

T-Sequence Measurement in Low-Level Decoding

A T-sequence measuring section 15 of the low-level decoding section 13d1 performs a T-sequence measuring process (Step S132).

More specifically described, a sequence converting means 15a of the T-sequence measuring section 15 converts the X-sequence to a T-sequence. In this conversion, the neighboring two variables, Xi and Xi+1 are added, and when the X-sequence on the left column (data column) shown in FIG. 12 is converted to a T-sequence, the line width array becomes [6(5+1), 2(1+1), 2(1+1), 2(1+1), 2(1+1), 6(1+5), 7(5+2)].

Next, a line width normalizing means 15b of the T-sequence measuring section 15 performs a line width normalizing process. The line width normalizing process is a process that converts the line widths expressed by the number of pixels that express the measured line widths of the bars and the widths of the spaces into a module count expression. More specifically described, in the PDF417 which is a type of the stacked barcode 21, one column including the data column consists of 17 modules. When the line widths inside one column are set as W1, W2, W3, W4, W5, W6, W7, and W8 and Wc=W1+W2+W3+W4+W5+W6+W7+W8, the normalized line widths are in the X-sequence expressed by Xi=Wi*17/Wc (i=1, 2, . . . , 7, 8). For example, the X-sequence on the left column shown in FIG. 12 becomes a line width array as in [5, 1, 1, 1, 1, 1, 5, 2] (the sum of these is 17, that is, the above-described 17 modules.

A judging means 15c of the T-sequence measuring section 15 judges whether or not a cluster number calculated from the T-sequence in which the line widths are normalized agrees with a theoretical value.

Priority Order Decision in Low-Level Decoding

Finally, the code word converting section 16 of the low-level decoding section 13d1 performs a code word conversion (Step S133). More specifically, by retrieving the code word conversion table from the table memory 16a and referring to a conversion table, the code word corresponding to the T-sequence obtained in Step S132 is obtained. In other words, the low-level decoding process is performed wherein the code word composed of four bar line widths and four space widths which together configure one column is temporarily converted to intermediate data expressed by 929 codes, which use the numbers 0 through 928.

In Embodiment 1, an optimal sequence can be selected from the multiple X-sequences which have been obtained by the threshold scheme and the second order differentiation method in the X-sequence measuring process (Step S131).

Threshold Scheme

Figure 14:
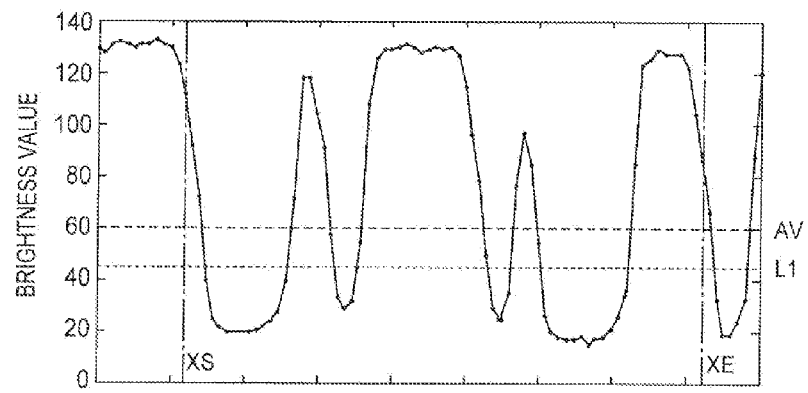
FIG. 14 shows a portion of the scanned reflection coefficient waveform showing the brightness values of a row of the stacked barcode.

FIG. 14 is a portion of the scanned reflection coefficient waveform of the brightness value of every pixel, obtained by scanning the line waveform for which multiple lines L contained in a certain row are averaged, and corresponds to a certain row and a certain column in the stacked barcode 21. A bar or a space is determined according to the brightness value of the pixel, higher or lower than the first fixed threshold value, AV; more specifically described, the X-sequence is valid if the total number of bars and spaces is 8 between the starting point XS to the ending point XE of the certain column. In the example shown in FIG. 14, the X-sequence (the line widths of the bars and the widths of the spaces) is measured based on the first fixed threshold AV and the line width array is obtained as shown in X-sequence [12, 6, 3, 18, 3, 4, 12, 11]. The first fixed threshold AV is an average value of all the image data composed of the bar line widths and space widths which are obtained by scanning the averaged line waveform in the certain row and certain column. Describing in more detail, the brightness values of all the measured pixels in the row and column shown in FIG. 14 are added, and the value obtained by dividing the added values by the number of the total pixels, that is the average brightness value of one pixel, is the fixed threshold value AV. Therefore, the first fixed threshold AV is a constant variable as shown in FIG. 14. Thus, the first fixed threshold AV can be obtained by a one-time process, shortening the process time.

N-th Order Differentiation

Figure 15:
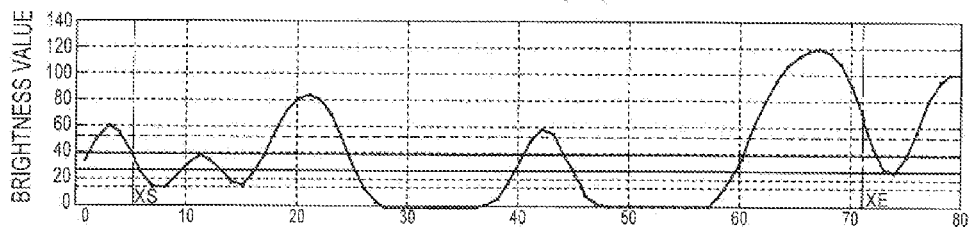
FIG. 15 shows graphs to explain an n-th order differentiation.
Figure 15:
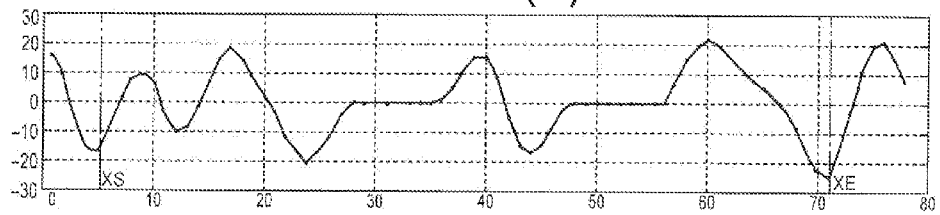
Figure 15:
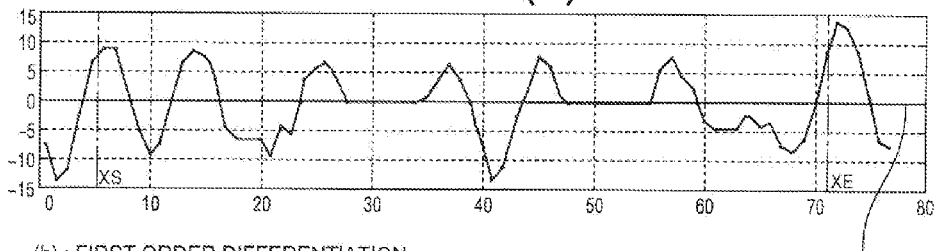

FIG. 15 shows diagrams to explain an n-th order differentiation. FIG. 15 (a) is a partial view of the scanned reflection coefficient waveform showing the brightness of each pixel, obtained by scanning the line waveform for which multiple lines L contained in a certain row are averaged. FIG. 15 (b) is a waveform showing the difference of the brightness values obtained by differentiating the scanned reflection coefficient waveform shown in (a); FIG. 15 (c) is a waveform showing the difference of the brightness values obtained by further differentiating (a second order differentiation) the waveform of (b).

The second order differentiation is to differentiate twice the scanned reflection coefficient waveform showing the brightness value of each pixel to obtain the secondary differentiation value and to take the zero crossing points (that is, the inflection points) of the secondary differentiation values as the boundaries between the bars and the spaces. While the method such as a threshold scheme detects the peaks of the waveform which are easily affected by the resolution, this second order differentiation calculates the inflection points of the waveform to obtain the boundaries between the bars and the spaces, providing the advantage of a simplified process. Note that the resolution of the scanned reflection coefficient waveform shown in FIG. 15 (a) is lower than that shown in FIG. 14.

X-Sequence Measuring Process

Figure 13:
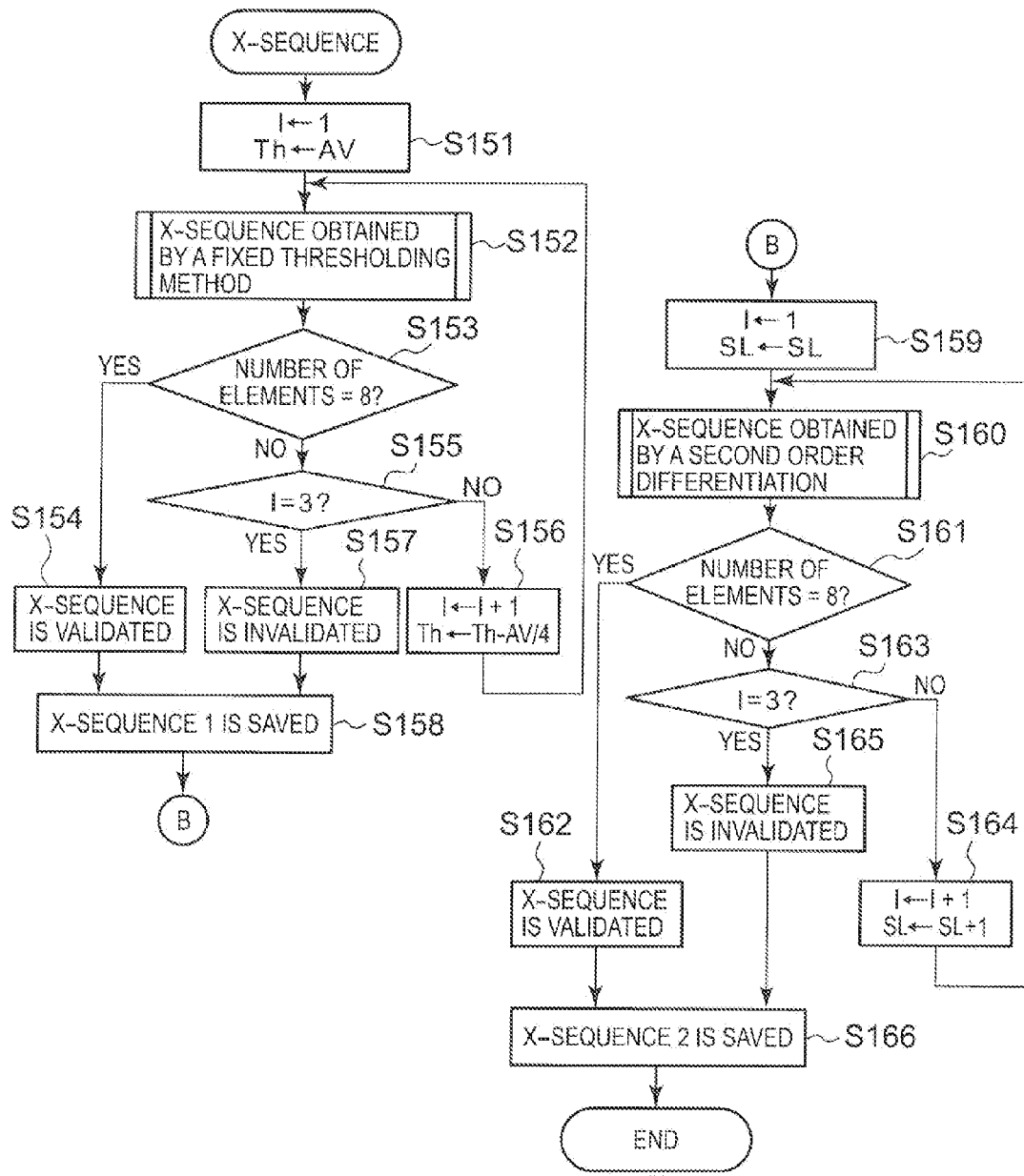
FIG. 13 shows a flow chart of an X-sequence measuring process.

FIG. 13 is a flow chart of the X-sequence measuring process (Step S131). In the X-sequence measuring process, as described above, the line waveform obtained by averaging multiple lines L contained in a certain row is scanned; when the measured brightness of a pixel is higher is than a predetermined threshold, Th, it is judged that it is a space; when the brightness of a pixel is lower than the threshold, Th, it is judged that it is a bar. Further, based on the judgment, the line widths of the bars and the widths of the spaces are measured to create line width array. Each column in the stacked barcode 21 consists of four bars and four spaces, and thus, eight bars and spaces in total are contained (in a single column); therefore, the process is repeated and the threshold, Th, is changed until the total number of the line widths which are formed by the neighboring intersection points of the scanned reflection coefficient waveform with the (fixed) threshold, AV, equals eight.

In Embodiment 1, as shown in FIG. 13, a fixed threshold calculating means 14a1 obtains an X-sequence by a (fixed) threshold scheme first (Step S151 through Step S158).

In other words, when I=1, a first threshold value AV is set as a threshold value, Th (Step S151). Note that the fixed threshold value AV is described later.

Next, the X-sequence when the first fixed threshold, Th, is equal to AV is measured (Step S152), and it is judged whether or not the total number of the bars and spaces at that time is eight (Step S153). When it is judged in Step S153 that the total number is eight, the X-sequence measurement is considered successful and therefore, the X-sequence at that time is validated (Step S154) and saved as X-sequence 1 (Step S158). On the other hand, when it is judged in Step S153 that the total number is not eight, it is judged whether or not the process has been repeated for a given number of times I (I is an integer of 2 or larger), whether or not I=3, for example (Step S155).

When it is judged in Step S155 that I is not 3, the given number of times, I is incremented by 1, and a second fixed threshold, Th, which is obtained by subtracting AV/4 from the first fixed threshold, Th, is set (Step S156) and the processes of Step S152 and Step S153 are repeated in this embodiment 1. Note that in FIG. 14, the code L1 indicates the n-th fixed threshold value, Th, which is obtained by subtracting AV/4 from the (n−1)-th fixed threshold, Th. Also, AV/4 is a value determined from the experimental rule, but the present invention is not limited to this.

Based on the newly-obtained second fixed threshold value, Th, the X-sequence is re-measured (Step S152). When it is judged that the total number is 8, the X-sequence is validated (Step S154). When it is judged that the total number is not 8, the given number of times, I is not 3 (Step S155); therefore, I is incremented by 1 and a new third fixed threshold value, Th, is set by further subtracting A/4 from the second fixed threshold, Th (Step S156), and the X-sequence is re-measured based on the third fixed threshold, Th (Step S152). If it is not judged in Embodiment 1 that the total number is 8 even after repeating the process with the given number of times, I=3, the X-sequence is invalidated (Step S157) and saved as X-sequence 1 (Step S158).

When the X-sequence measuring process by a (fixed) threshold scheme is finished as described above, the n-th order differentiation calculating means 14a3 obtains the X-sequence by a second order differentiation method (Step S159 through Step S166).

In other words, when I=1, a zero crossing point, SL, is established (Step S159).

Next, the X-sequence at that time is measured (Step S160) and it is judged whether or not the total number at that time is 8 (Step S161). When it is judged in Step S161 that the total number is 8, the X-sequence measurement is considered successful and the X-sequence at that time is validated (Step S162) and saved as X-sequence 2 (Step S166). On the other hand, when it is judged that the total number is not eight, it is judged whether or not the processes have been repeated for the given number of times I (I is an integer of 2 or larger), whether or not I=3, for example (Step S163).

When it is judged in Step S163 that I is not 3, the given number of times, I is incremented by 1 and the zero crossing point, SL, is incremented by 1 (Step S164), and the processes Step S160 and Step S161 are repeated.

The X-sequence is re-measured based on the newly-obtained zero-crossing, SL (Step S160). When it is judged that the total number is eight, the X-sequence is validated (Step S162). When it is not judged that the total number is eight, the given number of times, I, is not 3 (Step S163); therefore, I is incremented by 1 and (the line indicating) the zero-crossing, SL, is incremented by 1 (Step S164) and (the line indicating) the second zero-crossing, SL2, is calculated. Then, the X-sequence is re-measured based on (the line indicating) the second zero-crossing (Step S160). In Embodiment 1, if it is not judged that the total number is eight even after repeating the process for the given number of times, I=3, the X-sequence is invalidated (Step S165) and saved as X-sequence 2 (Step S166). Note that although the increment is by 1, the present invention is not limited to this number.

Figure 16:
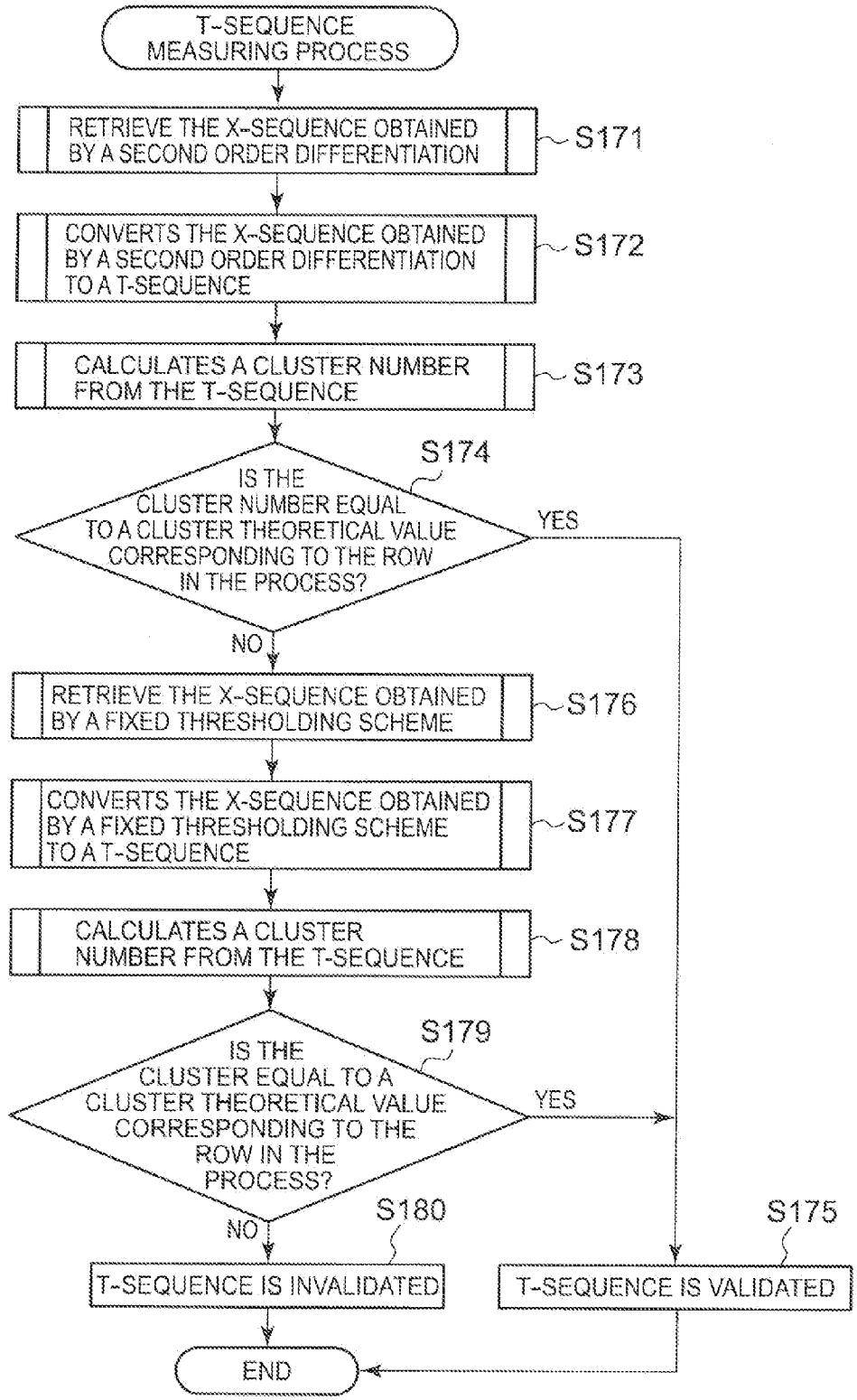
FIG. 16 shows a flow chart of a T-sequence measuring process.

FIG. 16 is a flow chart of a T-sequence measuring process (Step S132) in Embodiment 1. In the T-sequence measuring process, a sequence converting means 15a of the T-sequence measuring section 15 converts X-sequence 1 (the X-sequence obtained by the fixed threshold scheme) and X-sequence 2 (the X-sequence obtained by the second order differentiation method) to a T-sequence respectively, a line width normalizing means 15b of the T-sequence measuring section 15 normalizes the line widths in the T-sequence, and a judging means 15c of the T-sequence measuring section 15 compares the cluster values calculated from the T-sequence with theoretical values of the clusters. Then, when they are the same, the T-sequence having the agreeing cluster numbers is validated; when they are not the same, the T-sequence having the disagreeing cluster numbers is invalidated.

The cluster values are prepared to minimize the probability of error occurrence in the stacked barcode 21 shown in FIG. 3, being present in every code word except in the start pattern and stop pattern. More specifically, a cluster number appears repeatedly in every three lines according to the PDF417 standard, and a cluster number "0" is used for row 1, a cluster number "3" is used for row 2, and a cluster number "6" is used for row 3. In other words, these cluster numbers "0", "3" and "6" are the theoretical values of the cluster numbers.

Next, details are described by more specific number values.

First, the X-sequence obtained by the second order differentiation is retrieved (Step S171) and converted to a T-sequence (Step S172). More specifically, in the obtained sequence X=[Xi, Xi+1, Xi+2, . . . ], the neighboring Xi and (Xi+1) are added. For example, X=[12, 5, 5, 16, 4, 4, 12, 10] is measured from the scanned reflection coefficient waveform shown in FIG. 15 (c); when this X is converted to a T-sequence, the line width array becomes T=[17, 10, 21, 20, 8, 16, 22].

Next, the cluster numbers are calculated from the T-sequence (Step S173). In the cluster calculation, the T-sequence is first normalized through TN(i)=T(i)*17/Wc (i=0, 1, . . . , 7). In the above example, the line width array is TN=[4, 3, 5, 5, 2, 4]. Next, a cluster number K is calculated by an equation expressed by K=(TN (0)−TN (1)+TN (4)−TN (5)+9) mod 9 (where "mod 9" is a remainder after the division by 9). In the above example, K=(4−3+2−4+9) mod 9=8.

Next, it is judged whether or not the cluster number calculated in Step S173 is equal to the theoretical value of the cluster value which corresponds to the row in the process (Step S174). If the row in the process is the first line of the stacked barcode 21, the theoretical value for the cluster is "0". Therefore, since the cluster number "8" does not agree with the theoretical value for the cluster, "0", the T-sequence is invalidated and the process moves to Step S176. On the other hand, if the cluster number agrees with the theoretical value, the T-sequence is validated (Step S175).

When the cluster number does not agree with the theoretical value in Step S174, the X-sequence obtained by the (fixed) threshold scheme is retrieved (Step S176) and converted to a T-sequence (Step S177). X=[12, 6, 3, 18, 3, 4, 12, 11] is measured from the X-sequence obtained by the (fixed) threshold scheme, which, for example, is the scanned reflection coefficient waveform shown in FIG. 14, and the X-sequence is converted to a T-sequence, which is T=[18, 9, 21, 21, 7, 16, 23].

Next, a cluster number is calculated from the T-sequence (Step S178). In the above example, the line width array is normalized to TN=[4, 2, 5, 5, 2, 4] and K is expressed by K=(4−2+2−4+9)mod 9=0.

Next, it is judged whether or not the cluster number calculated in Step S173 is equal to the theoretical value of the cluster which corresponds to the row in the process (Step S179). In the above example, the cluster number "0" agrees with the theoretical value "0" of the cluster number; therefore, the T-sequence is validated (Step S175). On the other hand, when the cluster number does not agree with the theoretical value, the T-sequence is invalidated (Step S180).

Thus, in embodiment 2, as in the description of embodiment 1, two kinds of low-level decoding methods, one by the (fixed) threshold scheme and the other by the second order differentiation, are equipped; they are used properly for different resolutions, high or low, of an image pickup optical system so that the most appropriate X-sequence (X-sequence 1 or X-sequence 2) can be obtained even if the scanned reflection coefficient waveform of the stacked barcode 21 deviates.

When the most appropriate X-sequence is obtained, a low-level decoding process is performed and a code word conversion is performed (Step S133). More specifically, a code word corresponding to the validated X-sequence is obtained from the predetermined conversion table. In other words, a low-level decoding process is performed in which the code word composed of the line widths of four bars and the widths of four spaces which together configures one column is temporarily converted to intermediate data expressed by 929 codes, which use the numbers 0 through 928.

High-Level Decoding

When the code word conversion is completed, a normal high-level decoding is performed (Step S37) and then the decoding process is completed. Also, the data on which the decoding process is completed is output together with the stacked barcode information to a host controller. More specifically described, a high-level decoding process is performed such that the code word is temporarily converted to intermediate data expressed by 929 codes which use the numbers 0 through 928, and then decoded into a final language based on a predetermined rule. The final language for the PDF417 may be the ASCII character set, binary expressions or other characters.

Major Effects of Embodiment 1

As described above, even when the scanned reflection coefficient waveform of the stacked barcode 21 deviates, the stacked barcode 21 can be read accurately in Embodiment 1. More specifically, when the resolution of an image pickup optical device is at a certain level, a low-level decoding by a (fixed) threshold scheme may be adopted in which a threshold is determined by detecting peak values in the scanned reflection coefficient waveform of the stacked barcode 21. On the other hand, when the resolution of an image pickup optical system is not at a certain level, the scanned reflection coefficient waveform of the stacked barcode 21 deviates, or it is difficult to detect accurate peak values; however, a low-level decoding by a second order differentiation method can be adopted in which output changes in the edge (boundary) portions between the bars and the spaces can be extracted highly-precisely by taking a difference of the brightness values.

Consequently while minimally affected by the deviation of the scanned reflection coefficient waveform of the stacked barcode 21, the stacked barcode 21 can be read precisely.

Also, even when the medium transporting speed is increased or decreased during the image pickup, a low-level decoding by a (fixed) threshold scheme and a low-level decoding by a second order differentiation method are used in combination, providing the advantage of responding to the speed change.

Embodiment 2 of the Invention

Embodiment 2 of the present invention is described hereinafter.

Embodiment 2 of the present invention is shown in FIG. 1 through FIG. 17. Note that since a block diagram of an electrical configuration of a stacked barcode reader, a diagram showing an example of the stacked barcode, a flow chart of a stacked barcode reading method and the like in Embodiment 2 of the present invention are similar to those of the above-described embodiment 1 of the present invention, the same figures are used for FIG. 1, FIG. 3 through FIG. 10 and FIG. 12 to FIG. 16. To simplify the description, the descriptions for these portions are omitted, and the same numbers as those in Embodiment 1 are used in the descriptions for the configuration having the same function. Hereinafter, Embodiment 2 is described using FIG. 2 (b), FIG. 11(b) and FIG. 17 focusing on the different points from the above-described embodiment 1.

FIG. 1 through FIG. 17 show an embodiment 2 of the present invention. In

Embodiment 2, an image pickup device 11 is used for an imaging section; a data processing device 13 is used for an data processing section; a threshold calculating means 14a is used for a line width calculating means; a fixed threshold calculating means 14a1 and a local threshold calculating means 14a2 are used for a binary threshold calculating means; a T-sequence measuring section 15 is used for a T-sequence measuring means; a code word converting section 16 is used for a code word obtaining means; and a priority order deciding section 17 is used for a priority order deciding means.

Stacked Barcode Reader

FIG. 1 is a block diagram of an electrical configuration of a stacked barcode reader 1 of an embodiment 1 of the present invention. FIG. 2 (a) is a block diagram of a low-level decoding section of the stacked barcode reader of Embodiment 1.

In FIG. 1, the stacked barcode reader 1 is equipped with an image pickup device 11 that has a close-contact type image scanner 11a and a card transport mechanism 11b, an image memory 12 and a data processing device 13. The data processing device 13 has a position-detecting section 13a, a tilt-correcting section 13b, a structure-analyzing section 13c and a decoding section 13d. Also, a stacked barcode 21 which is a type of 2D barcode is printed on a recording medium 2 such as a card. The decoding section 13d has a low-level decoding section 13d1 and a high-level decoding section 13d2.

The low-level decoding section 13d1 is equipped with an X-sequence measuring section 14, a T-sequence measuring section 15, a priority order deciding section 17 and a code word converting section 16, as shown in FIG. 2 (a).

As shown in FIG. 2 (b), Embodiment 2 is different from Embodiment 1 in that the low-level decoding section 13d1A is equipped with the priority deciding section 17. Other configurations function the same as Embodiment 1; therefore, the same numbers are used and their descriptions are omitted.

The priority order deciding section 17 functions to determine a prioritized T-sequence based on the maximum value of the frequency distribution of the line widths of the bars and the spaces of the stacked barcode 21 in the priority order deciding process in a stacked barcode reading method which is described later.

Stacked Barcode: The Structure of PDF417

FIG. 3 is a diagram showing an example of the stacked barcode 21 (a label structure in a stacked barcode called a PDF417). Note that configurations function the same as Embodiment 1; therefore, the same numbers are used and their descriptions are omitted.

Stacked Barcode Reading Method

A stacked barcode reading method of Embodiment 1 of the present invention is described hereinafter. Note that a flow chart of the stacked barcode reading method and the like in Embodiment 2 of the present invention are similar to those in Embodiment 1 of the present invention; therefore, their descriptions are omitted and the same numbers as Embodiment 1 are used to describe the configurations having the same functions. Embodiment 2 is described hereinafter focusing on the different points from the above-described embodiment 1 referring to FIG. 11 (b), FIG. 17 and the like.

Low-Level Decoding

FIG. 11 (b) is a flow chart of the low-level decoding (Step S36) of Embodiment 2, found in the flow chart of FIG. 5. A different point in Embodiment 2 from Embodiment 1 is, as shown in FIG. 11 (b), that the priority deciding section 17 of the low-level decoding section 13d1A performs the priority deciding process using the steps S1321 and S1322 between Step 132 in which the T-sequence measuring process is performed and Step S133 in which the code word conversion is performed. Since other configurations are the same as Embodiment 1, the same numbers are used.

As shown in FIG. 11 (a), this low-level decoding is performed using the scanned reflection characteristic of each row of the stacked barcode 21. More specifically, it is performed mainly in three steps involving an X-sequence measurement, a T-sequence measurement and a code word conversion. The X-sequence measurement takes out a segment which uses the column boundaries determined by the column analysis as its both ends (that is a scan reflection characteristic) and obtains a numeric series called X-sequence composed by an array of the line widths of bars and the widths of spaces which together configure one column. Next, the T-sequence measurement obtains a numeric series called T-sequence by adding two neighboring bar and space in the X-sequence while shifting one by one. Then, the code word conversion determines a code word corresponding to each T-sequence referring to a code word conversion table that is prepared in advance.

X-Sequence Measurement in Low-Level Decoding

Note that a low-level decoding process and a high-level decoding process are performed on PDF417 which is a type of the stacked barcode 21; the low-level decoding process is a process in which a code word of a column that configures the data column is temporarily converted into intermediate data expressed by 929 codes which uses the numbers 0 to 928. The high-level decoding process decodes the temporarily-converted intermediate data that is expressed by 929 codes into a final language based on a predetermined rule. The final language for PDF417 includes the ASCII character set, binary expressions, or other characters.

In FIG. 11 (a), an X-sequence measuring section 14 of the low-level decoding section 13d1 performs an X-sequence measuring process (Step S131). In a general X-sequence measuring process, a line width-measuring means 14b of the X-sequence measuring section 14 scans a line waveform obtained by averaging the multiple lines L contained in each row to measure the line widths of the bars and the widths of the spaces, and then the line width expressed by the number of pixels is converted to a module count expression to obtain the X-sequence. Note that a scanning line goes along the multiple lines L formed in the center of each row in the row direction, that is a matrix of the pixels composed of the multiple lines. Further, the average of the brightness values of the pixels which configure the multiple lines L is calculated; based on the averaged pixel brightness value (the brightness value obtained through calculation), a decoding process is performed on the scanned reflection coefficient waveform that shows the brightness values of the pixels in the TOW.

FIG. 12 is a waveform showing a portion of a scanned reflection coefficient waveform of the brightness values of the pixels, which is obtained by scanning the line waveform for which the multiple lines L contained in the row are averaged. Note that the line widths of the bars and the widths of the spaces are obtained by counting the number of pixels between the transition points of the scanned reflection coefficient waveform of the brightness values of the pixels. The transition points here are the points of the scanned reflection coefficient waveform of the brightness values of the pixels intersecting with a predetermined threshold value which is not shown in the figure. The PDF417, a type of the stacked barcode 21 that uses a coding scheme, as shown in FIG. 4, etc., is configured by the start pattern, the left row indicator, the data column, the right row indicator and the stop pattern. Further, each column except the stop pattern consist of four bars and four spaces; therefore, when there is no damage to the scanned reflection coefficient waveform of the brightness values of the pixels, eight line widths are obtained in total.

On the other hand, when there is an abnormality in the scanned reflection coefficient waveform of the brightness values of the pixels, eight or more (nine) line widths are obtained. In such a case, it is understood that there is damage to the column, and a graph indicating that this column has low reliability is set. After performing such an operation to all the columns contained in a certain row, the same process is performed to the next row. When the line widths are obtained from all the rows, the X-sequence measuring process of Step S131 (see FIG. 11(b)) is finished.

T-Sequence Measurement in Low-Level Decoding

A T-sequence measuring section 15 of the low-level decoding section 13d1 performs a T-sequence measuring process (Step S132).

More specifically described, a sequence converting means 15a of the T-sequence measuring section 15 converts the X-sequence to a T-sequence. In this conversion, the neighboring two variables, Xi and Xi+1 are added, and when the X-sequence on the left column (data column) shown in FIG. 12 is converted to a T-sequence, the line width array becomes [6(5+1), 2(1+1), 2(1+1), 2(1+1), 2(1+1), 6(1+5), 7(5+2)].

Next, a line width normalizing means 15b of the T-sequence measuring section 15 performs a line width normalizing process. The line width normalizing process is a process that converts the line widths expressed by the number of pixels that express the measured line widths of the bars and the widths of the spaces into a module count expression. More specifically described, in the PDF417 which is a type of the stacked barcode 21, one column including the data column consists of 17 modules. When the line widths inside one column are set as W1, W2, W3, W4, W5, W6, W7, and W8 and Wc=W1+W2+W3+W4+W5+W6+W7+W8, the normalized line widths are in the X-sequence expressed by Xi=Wi*17/Wc (i=1, 2, . . . , 7, 8). For example, the X-sequence on the left column shown in FIG. 12 becomes a line width array as in [5, 1, 1, 1, 1, 1, 5, 2] (the sum of these is 17, that is, the above-described 17 modules.

A judging means 15c of the T-sequence measuring section 15 judges whether or not a cluster number calculated from the T-sequence in which the line widths are normalized agrees with a theoretical value.

Priority Order Decision in Low-Level Decoding

Next, a priority deciding section 17 of the low-level decoding section 13d1A performs a priority deciding process (Step S1321 and Step S1322). More specifically described, on X-sequence 1 (the X-sequence obtained by a (fixed) threshold scheme) and X-sequence 2 (the X-sequence obtained by a second order differentiation method), the maximum value of the frequency distribution of the bar and space line widths is calculated as the evaluation value (dominance index) (Step S1321), and based on the result, a T-sequence that is used with priority is decided (Step S1322).

Figure 17:
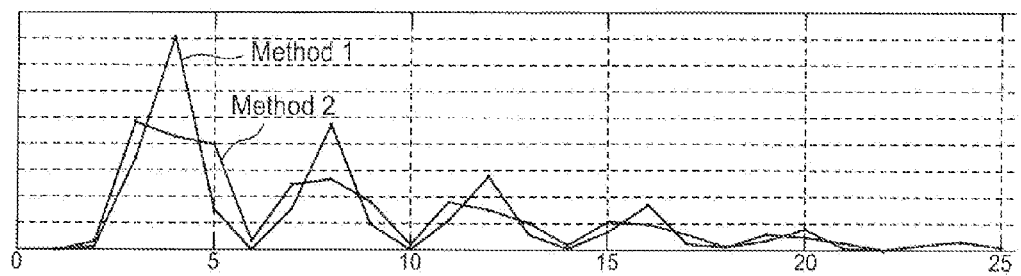
FIG. 17($a$) shows a graph showing frequency distributions of the element widths of the stacked barcode in Embodiment 2, which shows that the maximum value of the frequency distribution of the line widths of the bars and the spaces, obtained by a fixed threshold scheme (Method 1) is larger than that obtained by a second order differentiation method (Method 2)
Figure 17:
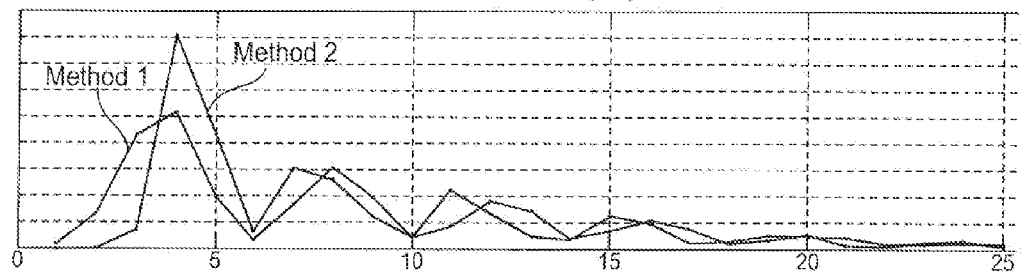

In other words, at the point when the T-sequence measurement (Step S132) is finished, two kinds of X-sequences, 1 and 2, and two kinds of T-sequences generated from the X-sequences have been obtained In Step S133, the frequency distribution of the line widths of all the bars and spaces of X-sequences except the start mark and the stop mark in each of the X-sequences 1 and 2 are obtained. FIG. 17 shows the frequency distribution. In the graphs of FIGS. 17 (a) and (b), the horizontal axis indicates line widths (unit: the number of pixels) of bars (spaces), and the vertical axis indicates the frequency. Also, Method 1 is associated with a graph showing the frequency distribution of the line widths of the bars (spaces) obtained by a fixed threshold scheme; Method 2 is associated with a graph showing the frequency distribution of the line widths of the bars (spaces) obtained by a second order differentiation.

There are six peaks in each of FIGS. 17 (a) and (b) because there are six line widths of the bars (spaces), and this follows the PDF417 standard. FIG. 17 (a) corresponds to the scanned reflection coefficient waveform of high resolution and FIG. 17 (b) corresponds to the scanned reflection coefficient waveform of low resolution. In the graphs of FIGS. 17 (a) and (b), the peak on the far left (the first peak) in the frequency distribution of the line widths of bars (spaces) corresponds to the line width of the thinnest bar (space) (about four pixels), and can be affected most easily by a strain of the scanned reflection coefficient waveform. The first peak is higher and sharper in the scanned reflection coefficient waveform of high resolution obtained by the fixed threshold scheme (Method 1) than by the second order differentiation method (Method 2) (FIG. 17 (a)). On the other hand, the first peak is lower and wider in the scanned reflection coefficient waveform of low resolution (FIG. 17 (b)) obtained by the fixed threshold scheme (Method 1) than by the second order differentiation method (Method 2). This means that when the resolution of the scanned reflection coefficient waveform is high, the variation of the line width of the bar (space) is small and the sharp edge is high with the fixed threshold scheme; when the resolution of the scanned reflection coefficient waveform is low, the variation of the line width of the bar (space) is small and the sharp edge is high with second order differentiation method. Therefore, it can be surmised that, if the T-sequence with the first peak having the higher sharp edge is adopted, code words may be decoded more accurately with fewer errors in a code word conversion (Step S135), which is described later.

Code Word Conversion in Low-Level Decoding

Finally, a code word converting section 16 of the low-level decoding section 13d1A performs a code word conversion (Step S135). More specifically, a code word conversion table is read from the table memory 16a and a code word corresponding to the T-sequence calculated in Step S132 is obtained by referring to the conversion table. In other words, a low-level decoding process is performed wherein the code word composed of the line widths of the four bars and the widths of the four spaces which together configure one column is temporarily converted to the intermediate data expressed by the 929 codes which uses the numbers 0 through 928.

In Embodiment 2, an optimal sequence can be selected from the multiple X-sequences which have been obtained by the threshold scheme and the second order differentiation method in the X-sequence measuring process (Step S131). Note that the description of selecting the most appropriate X-sequence from the multiple X-sequences of Embodiment 2 is the same as that of embodiment 1. Therefore, the description of selecting the most appropriate X-sequence from the multiple X-sequences of Embodiment 1 is used and that of Embodiment 2 is omitted here.

Thus, in embodiment 2, as in the description of embodiment 1, two kinds of low-level decoding methods, one by the (fixed) threshold scheme and the other by the second order differentiation, are equipped; they are used properly for different resolutions, high or low, of an image pickup optical system so that the most appropriate X-sequence (X-sequence 1 or X-sequence 2) can be obtained even if the scanned reflection coefficient waveform of the stacked barcode 21 deviates.

When the most appropriate X-sequence is obtained, a low-level decoding process is performed and a code word conversion is performed (Step S133). More specifically, a code word corresponding to the validated X-sequence is obtained from the predetermined conversion table. In other words, a low-level decoding process is performed in which the code word composed of the line widths of four bars and the widths of four spaces which together configures one column is temporarily converted to intermediate data expressed by 929 codes, which use the numbers 0 through 928.

High-Level Decoding

When the code word conversion is completed, a normal high-level decoding is performed (Step S37) and then the decoding process is completed. Also, the data on which the decoding process is completed is output together with the stacked barcode information to a host controller. More specifically described, a high-level decoding process is performed such that the code word is temporarily converted to intermediate data expressed by 929 codes which use the numbers 0 through 928, and then decoded into a final language based on a predetermined rule. The final language for the PDF417 may be the ASCII character set, binary expressions or other characters.

Major Effects of Embodiment 2

As described above, a priority order of T-sequence is determined based on the evaluation value of the frequency distribution (the maximum value in Embodiment 2) of the line widths of the bars and the spaces which together configure the stacked barcode 21 in embodiment 2. Therefore, despite the degree of resolution of the image pickup optical system, the number of the code words that have errors can be reduced to improve the reading performance of the barcode reader on the stacked barcode 21.

Consequently, even when the scanned reflection coefficient characteristic of the stacked barcode 21 deviates, the stacked barcode 21 can be read accurately.

Other Embodiments of the Invention

Figure 18:
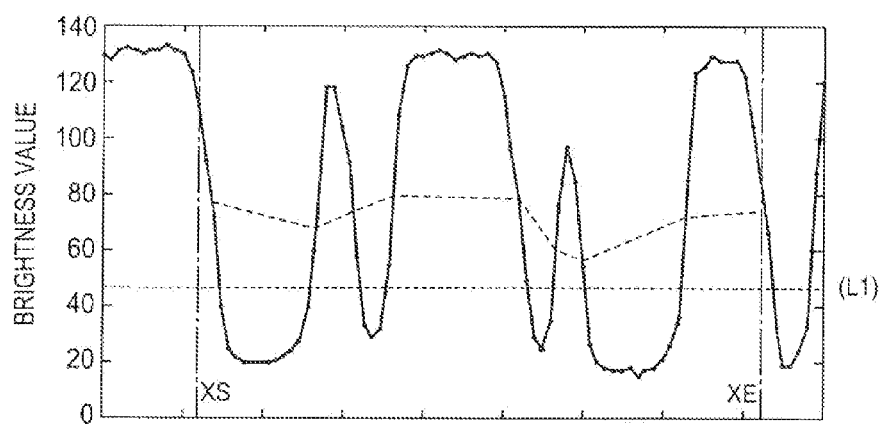
FIG. 18 shows a portion of the scanned reflection coefficient waveform showing the brightness values in a row of the stacked barcode to explain the stacked barcode reading method in a modification example of the present invention.

FIG. 18 is a partial waveform of the brightness values of a row in a stacked barcode to explain a stacked barcode reading method of other Embodiments of the present invention.

In the above-described embodiment 1and 2, the X-sequence measuring process (Step S131) of the stacked barcode reading method is described using the fixed threshold scheme and the second order differentiation. However, in place of the fixed threshold scheme and the second order differentiation, a local thresholding scheme may be used in the present invention.

The local thresholding scheme, as shown in FIG. 18, is a method to take a local threshold value, which is obtained based on the average of the maximum peak value and the minimum peak value of the neighboring bar and space of the image data, as a boundary between the bar and the space. The local thresholding scheme has the advantage of accurately detecting the widths of the bar and the space even when there are variations in the peak values due to non-uniform brightness or uncleanness of the corrected image data. When the local thresholding scheme is adopted, a local threshold calculating means $14a2$ of the X-sequence measuring section 14 calculates a local threshold value.

Other configurations are the same as those in the above-described embodiments 1 and 2. Therefore, the same effects as the above-described embodiments 1 and 2 can be obtained in the modification example of the above-described embodiments 1 and 2.

In the above-described embodiments, the low-level decoding in the stacked barcode reading method is described using the case that the low-level decoding is first performed based on the X-sequence measuring process by the second order differentiation (Step S171 through Step S174) and then the low-level decoding is performed based on the X-sequence measuring process by the (fixed) threshold scheme (Step S176 through Step S179). However, if it is necessary, the order of processes may be switched so that the low-level decoding is first performed based on the X-sequence measuring process by the (fixed) threshold method and then the low-level decoding is performed based on the X-sequence measuring process by the second order differentiation.

Note that the above-described embodiments 1 and 2 have used the case where the maximum value of the frequency distribution of the element widths is used as the evaluation value in the priority order deciding process (Step S133 and S134) of the stacked barcode reading method. However, in place of the maximum value of the frequency distribution of the element widths, a variance of the frequency distribution of the element widths (FWHM: Full Width at Half Maximum, for example) may be adopted. In this case, the smaller the variance of the frequency distribution of the element widths is, the higher the sharp edge of the frequency distribution is; therefore, the T-sequence having a smaller variance of the frequency distribution of the element widths is adopted.

Also, in the above-described embodiments, the X-sequence measuring process in the stacked barcode reading method is described using the case in which the threshold method uses the fixed threshold scheme to obtain the average of the brightness values of each pixel that together configures the scanned reflection coefficient waveform; however, a threshold method other than the fixed threshold method, such as a local thresholding scheme, may be substituted or used together. When a local thresholding method is adopted, the local threshold calculating means $14a2$ of the X-sequence measuring section 14 calculates local threshold values. As shown in FIG. 18, the local thresholding scheme is a method in which a local threshold value based on the average of the maximum peak value and the minimum peak value of the neighboring bar and space in the image data is taken as the boundary between the neighboring bar and space. Compared to the fixed thresholding scheme, the local thresholding scheme has an advantage of detecting the line widths of the bars and the spaces accurately, even when the peak values vary because of un-uniform brightness or uncleanness of the corrected image data.

Also, in the above-described embodiments 1 and 2, as shown in FIG. 16, the low-level decoding of the stacked barcode reading method is described using a case where the low-level decoding (Step S171 through Step S174) is performed based on the X-sequence measuring process using the second order differentiation method, and then the low-level decoding (step S176 through Step S179) is performed based on the X-sequence measuring process using the fixed threshold scheme. However, if it is necessary, this order of processes can be switched: the low-level decoding may be performed based on the X-sequence measuring process using the fixed threshold scheme first and then, the low-level decoding may be performed based on the X-sequence measuring process using the second order differentiation method.

In the above-described embodiments 1 and 2, a binary threshold calculating means that calculates a binary threshold value based on the waveform of the brightness values of multiple pixels which configure the image data of the stacked barcode 21 is used for the fixed threshold calculating means $14a1$ and the local threshold calculating means $14a2$. However, a binary threshold calculating means other than the above may be substituted or used in combination.

In the above-described embodiment 1, the X-sequence measuring process of the stacked barcode reading method is described using the case where the second order differentiation method is used for the n-th order differentiation method (that is, n=2); however, the first order differentiation (that is, n=1) may be adopted in place of the second order differentiation or used in combination.

Further, in the above-described embodiments 1 and 2, the stacked barcode tilt correction (Step S33) of the stacked barcode reading method is described using the case where the image data of the stacked barcode 21 is corrected and converted to the image data having a tilt angle of zero. However, the stacked barcode title correction can be omitted if it is guaranteed that the image data of the stacked barcode 21 is not tilted or, if, even if the image data of the stacked barcode 21 is tilted, another angle correcting means can correct it.

Also, in the above-described embodiments 1 and 2, the stacked barcode 21, which is a type of a 2D barcode is used for description; however, the present invention may be applied to a 1 Dbarcode in the same manner.

Furthermore, in the above-described embodiments 1 and 2, the present invention is applied to a combination of a 1D image pickup device and a linear transport mechanism; however, the present invention is not limited to this, but may be applied to a combination of an area sensor such as a 2D CCD or a CMO imager and an object support mechanism.

INDUSTRIAL USAGE POSSIBILITY

The present invention can be preferably applied to a stacked barcode reader in which the scanned reflection coefficient waveform of the barcode may be deviated depending on the level of the resolution of the image pickup optical system.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 Stacked barcode reader
2 Recoding medium
11 Image pickup device (imaging section)
11a Image scanner
11b Card transport mechanism
12 Image memory
13 Data processor (Data processing section)
13a Position detecting section
13b Tilt correcting section
13c Structure analyzing section
13d Decoding section
13d1 Low-level decoding section
13d2 High-level decoding section
14 X-sequence measuring section
14a Threshold calculating means (Line width calculating means)
14a1 Fixed threshold calculating means (Binary threshold calculating means)
14a2 Local threshold calculating means (Binary threshold calculating means)
14a3 n-th order differentiation calculating means
14b Line width measuring means
15 T-sequence measuring section (T-sequence measuring means)
15a Sequence converting means
15b Line width normalizing means
15c Judging means
16 Code word converting section (Code word obtaining means)
16a Table memory
17 Priority order deciding section (Priority order deciding means)
21 Stacked barcode

What is claimed is:

1. A stacked barcode reader comprising:
an image pickup section that captures an image of a stacked barcode in which character data is coded into barcode and displayed by bars and spaces;
an image memory that stores the image data of said stacked barcode captured by said imaging pickup section; and
a data processing section that has a decoding section for decoding the image data of said stacked barcode into character data;
wherein said decoding section includes:
a threshold calculating means that calculates a threshold value to measure line widths of the bars and the spaces of said stacked barcode by brightness values of multiple pixels that configure said image data;
an n-th order differentiation calculating means that calculates an n-th order differentiation value, where n=1 or 2, by performing an n-th order differentiation on a scanned reflection coefficient waveform that shows the brightness values of the multiple pixels of the image data;
a line width measuring means that measures the line widths of multiple bars and spaces of said stacked barcode based on said threshold or said n-th order differentiation value;
a T-sequence measuring means that measures a T-sequence from the line widths of the bars and the spaces of said stacked barcode, measured by said line width measuring means; and
a code word obtaining means that obtains a code word corresponding to the T-sequence measured by said T-sequence measuring means.

2. The stacked barcode reader as set forth in claim 1; wherein said n-th order differentiation value is a secondary differentiation value, and zero crossing points of said secondary differentiation values are taken as boundaries between said bars and said spaces.

3. The stacked barcode reader as set forth in claim 1; wherein said threshold value is either a fixed threshold value obtained based on an average value of the image data or a local threshold value obtained based on an average value of a maximum peak value and a minimum peak value of the neighboring bar and space of the image data.

4. A stacked barcode reading method for decoding a stacked barcode, in which character data is coded into a barcode and displayed by bars and spaces, into character data based on image data obtained by capturing an image of said stacked barcode, the method comprising:
a threshold calculating step that calculates a threshold value to measure the line widths of the bars and the spaces of said stacked barcode with the brightness values of multiple pixels which configure the image data;
an n-th order differentiation value calculating step that calculates an n-th order differentiation value, where n=1 or 2, by performing an n-th order differentiation on a scanned reflection coefficient waveform that shows the brightness values of the multiple pixels that configure the image data;

a line width measuring step that measures the line widths of the bars and the spaces of said stacked barcode based on said threshold value or said n-th order differentiation value;

a T-sequence measuring step that measures a T-sequence from the line widths of the bars and the spaces of said stacked barcode which is measured in said line width measuring step; and a code word obtaining step that obtains a code word corresponding to the T-sequence measured in said T-sequence measuring step.

5. The stacked barcode reading method as set forth in claim 4;

wherein, according to whether or not a cluster number obtained through the calculation from the T-sequence measured in said T-sequence measuring step is equal to a theoretical value, the validity of said T-sequence is determined.

6. A stacked barcode reader comprising:

an image pickup section that captures an image of a stacked barcode in which character data is coded and displayed by bars and spaces;

an image memory that stores the image data of said stacked barcode captured by said imaging section; and a data processing section having a decoding section that decodes said stacked barcode based on said image data;

wherein said decoding section includes:

a line width calculating means that calculates line widths of the bars and the spaces of said stacked barcode with brightness values of multiple pixels which configure said image data;

a priority order deciding means that decides the priority of T-sequence based on the evaluation value of a frequency distribution of the multiple line widths calculated by said line width calculating means;

a T-sequence measuring means that measures T-sequence according to the priority order of T-sequence determined by said priority deciding means; and a code word obtaining means that obtains a code word corresponding to the T-sequence measured by said T-sequence measuring means.

7. The stacked barcode reader as set forth in claim 6;

wherein said line width calculating means includes:

a binary threshold calculating means that calculates a binary threshold value based on a scanned reflection coefficient waveform that shows the brightness values of multiple pixels which configure said image data; and an n-th order differentiation value calculating means that calculates an n-th order differentiation value, where n=1 or 2, by performing an n-th order differentiation on said scanned reflection coefficient waveform that shows the brightness values of multiple pixels which configure said image data.

8. The stacked barcode reader as set forth in claim 6;

wherein said evaluation value is a maximum value of the frequency distribution.

9. The stacked barcode reader as set forth in claim 6;

wherein said evaluation value is a variance of the frequency distribution.

10. The stacked barcode reader as set forth in claim 6;

wherein said priority deciding means decides a priority order of T-sequence from a high sharp edge of the distribution of said line widths.

11. A stacked barcode reading method for decoding a stacked barcode, in which character data is coded into a barcode and displayed by bars and spaces, into character data based on image data obtained by capturing an image of said stacked barcode, the method comprising:

a line width calculating step that calculates multiple line widths of the bars and the spaces of said stacked barcode with brightness values of multiple pixels which configure said image data;

a priority deciding step that decides a priority order of T-sequence based on an evaluation value of a frequency distribution of the multiple line widths calculated in said line width calculating step;

a T-sequence measuring step that measures T-sequence according to said priority order of the T-sequence determined in said priority deciding step; and a code word obtaining step that obtains a code word corresponding to the T-sequence measured in said T-sequence measuring step.

12. The stacked barcode reading method as set forth in claim 11;

wherein, in said priority deciding step, a priority order of T-sequence is determined from a highest sharp edge of the frequency distribution of said line widths.

* * * * *